US012580728B2

(12) United States Patent (10) Patent No.: US 12,580,728 B2
Khan et al. (45) Date of Patent: Mar. 17, 2026

(54) EXECUTING REMOTELY A DATA PROCESSING APPLICATION

(71) Applicant: International Business Machines Corporation, Armonk, NY (US)

(72) Inventors: Muhammad Usman Karim Khan, Sindelfingen (DE); Stefan Schmitt, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 18/418,438

(22) Filed: Jan. 22, 2024

(65) Prior Publication Data

US 2025/0211417 A1 Jun. 26, 2025

(30) Foreign Application Priority Data

Dec. 20, 2023 (GB) ...................................... 2319576

(51) Int. Cl.
*H04L 29/06* (2006.01)
*G06F 21/62* (2013.01)
*H04L 9/00* (2022.01)

(52) U.S. Cl.
CPC .......... *H04L 9/008* (2013.01); *G06F 21/6227* (2013.01)

(58) Field of Classification Search
None
See application file for complete search history.

(56) References Cited

U.S. PATENT DOCUMENTS

| | | | | |
|---|---|---|---|---|
| 5,991,399 | A * | 11/1999 | Graunke | .......... G11B 20/00086 |
| | | | | 713/168 |
| 6,961,849 | B1 * | 11/2005 | Davis | ................. G06Q 20/3829 |
| | | | | 705/76 |
| 8,141,073 | B2 | 3/2012 | Bhandari | |
| 8,285,989 | B2 * | 10/2012 | Lucidarme | ............ H04L 9/0825 |
| | | | | 713/168 |
| 8,347,272 | B2 | 1/2013 | Sugawara | |

(Continued)

FOREIGN PATENT DOCUMENTS

CN 115102688 A 9/2022

OTHER PUBLICATIONS

"Client-Side Field Level Encryption", MongoDB, accessed on Jan. 5, 2024, 4 pages, <https://www.mongodb.com/docs/manual/core/csfle/>.

(Continued)

*Primary Examiner* — Maung T Lwin
(74) *Attorney, Agent, or Firm* — Stosch Sabo

(57) ABSTRACT

The present disclosure relates to a method for remotely executing a data processing application using data. The method comprises: identifying using the data processing application data attributes of the data and operations on the identified data attributes. The identified operations of the identified data attributes may be used for determining encryption configurations for the data attributes. The data processing application may be executed on a remote system, wherein the executing comprises executing a data provision method, the data provision method comprising: encrypting values of the first data attributes according to the respective encryption algorithm; and sending encrypted values and unencrypted values of the data attributes to the remote system.

19 Claims, 14 Drawing Sheets

(56) References Cited

U.S. PATENT DOCUMENTS

| | | | | |
|---|---|---|---|---|
| 8,930,708 | B2 * | 1/2015 | Lee | G06F 21/36 |
| | | | | 713/168 |
| 9,742,747 | B2 * | 8/2017 | Manges | H04L 63/205 |
| 9,749,128 | B2 | 8/2017 | Calapodescu | |
| 9,819,650 | B2 | 11/2017 | Soon-Shiong | |
| 10,333,715 | B2 * | 6/2019 | Chu | H04L 63/10 |
| 10,594,670 | B2 * | 3/2020 | Rohel | G06F 16/986 |
| 11,128,435 | B2 | 9/2021 | Zhang | |
| 11,586,757 | B2 * | 2/2023 | O'Hare | G06F 21/6227 |
| 11,641,274 | B2 * | 5/2023 | Paudyal | G06F 21/602 |
| | | | | 713/171 |
| 2016/0119119 | A1 | 4/2016 | Calapodescu | |
| 2018/0351923 | A1 | 12/2018 | Rohel | |
| 2018/0359078 | A1 * | 12/2018 | Jain | G06F 21/602 |
| 2020/0028823 | A1 | 1/2020 | Mukhopadhyay | |
| 2021/0014039 | A1 | 1/2021 | Zhang | |
| 2023/0188318 | A1 | 6/2023 | Paillier | |

OTHER PUBLICATIONS

Bakas et al., "Symmetrical Disguise: Realizing Homomorphic Encryption Services from Symmetric Primitives", (extend version)*, Tampere University, Tampere, Finland, 2020, 19 pages.

Boemer et al., "nGraph-HE: A Graph Compiler for Deep Learning on Homomorphically Encrypted Data", arXiv:1810.10121v3 [cs. CR] Apr. 2, 2019, 13 pages.

Chase et al., "Security of Homomorphic Encryption", 2019, 27 pages.

Disclosed Anonymously, "A Dynamic Fully Homomorphic Encryption System for Tree-based Model Inference", IP.com No. IPCOM000272606D, IP.com Electronic Publication Date: Jun. 28, 2023, 6 pages.

Disclosed Anonymously, "Cryptographic Policy Decision Engine", IP.com No. IPCOM000271772D, IP.com Electronic Publication Date: Feb. 8, 2023, 8 pages.

Disclosed Anonymously, "Secure Computation Architecture for Client-side Encryption", IP.com No. IPCOM000263004D, IP.com Electronic Publication Date: Jul. 21, 2020, 6 pages.

Gao, Shuhong, "Efficient Fully Homomorphic Encryption Scheme", May 21, 2018, Department of Mathematical Sciences, Clemson University, Clemson, SC, USA, 34 pages.

Khan et al., "Executing Remotely a Data Processing Application", United Kingdom Application No. 2319576.1, IBM Docket No. P202204794GB01, Filed Dec. 20, 2023, 63 pages.

UK Search Report for Application No. GB2319576.1, dated Jun. 26, 2024, 3 pages.

* cited by examiner

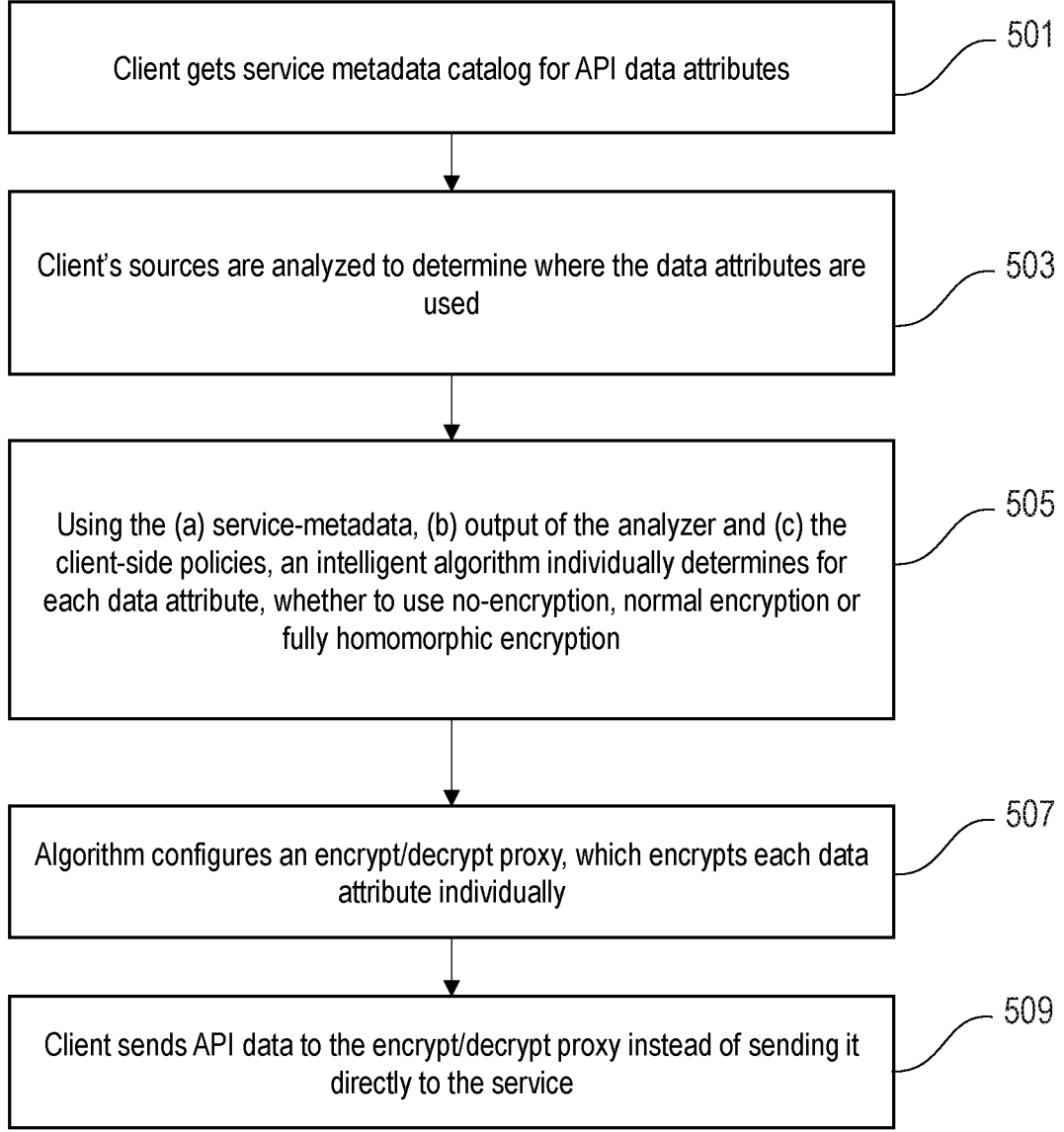

Client gets service metadata catalog for API data attributes — 501

Client's sources are analyzed to determine where the data attributes are used — 503

Using the (a) service-metadata, (b) output of the analyzer and (c) the client-side policies, an intelligent algorithm individually determines for each data attribute, whether to use no-encryption, normal encryption or fully homomorphic encryption — 505

Algorithm configures an encrypt/decrypt proxy, which encrypts each data attribute individually — 507

Client sends API data to the encrypt/decrypt proxy instead of sending it directly to the service — 509

Fig. 5

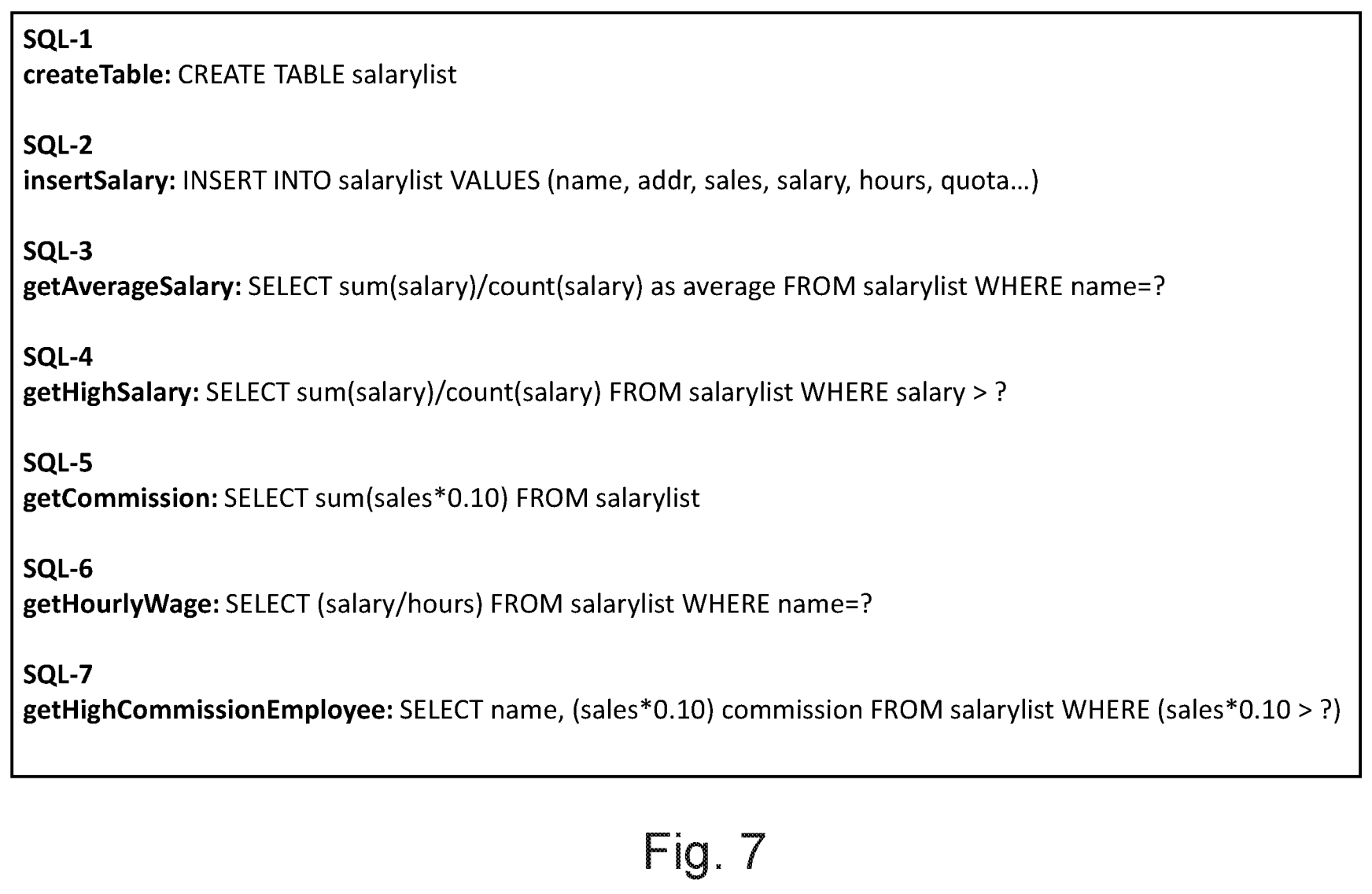

SQL-1
createTable: CREATE TABLE salarylist

SQL-2
insertSalary: INSERT INTO salarylist VALUES (name, addr, sales, salary, hours, quota...)

SQL-3
getAverageSalary: SELECT sum(salary)/count(salary) as average FROM salarylist WHERE name=?

SQL-4
getHighSalary: SELECT sum(salary)/count(salary) FROM salarylist WHERE salary > ?

SQL-5
getCommission: SELECT sum(sales*0.10) FROM salarylist

SQL-6
getHourlyWage: SELECT (salary/hours) FROM salarylist WHERE name=?

SQL-7
getHighCommissionEmployee: SELECT name, (sales*0.10) commission FROM salarylist WHERE (sales*0.10 > ?)

Fig. 7

```
Public class ServerConnect ()
{
    ...
    int storeValueToDB(Customer customer, String uuid, String timestamp, String ip, ...)
    {
        return customer.cloudService.storeValueToDB(uuid, timestamp, ip, ...);
    } int updateValueInDB(Customer customer, String uuid, String name, Sting ip, ...)
    {
        return customer.cloudservice.updateValueInDB(uuid, name, ip, ...);
    } int doTransaction(Customer customer, String uuid, String timestamp, String amount, String addr, ...)
    {
        if(amount > customer.constraints.getMaxAmount()) {
            return customer.constraints.getError(AMOUNT_ERR);
        }
        if(timestamp > 24*60*60*1000 && timestamp < 0) {
            return customer.constraints.getError(TIMESTAMP_ERR);
        }
        if(card != customer.getCardType()) {
            return customer.constraints.getError(CARD_ERR);
        }
        int returnValue = customer.cloudService.doTransaction(uuid, timestamp, amount, addr, ...);
        if(returnValue == 200) {
            customer.totalAmount += amount;
        }
        return returnValue;
    }
    ...
}
```

Fig. 9

```
API-1
StoreValueToDB: {
    uuid: "read/write/delete", → normal encryption
    timestamp: "read/write/delete/add/multiply", → FHE-2
    ip: "read/write/delete/multiply/compare", → FHE-1
    webAgent: "read/write/delete", → normal encryption
    city: "read", → no encryption
    ...
}
```

Fig. 10

| Data Attribute 1401 | External Service 1402 | Operation 1403 | Used as 1404 | Calculation 1405 | Dependency 1406 | At source location 1407 |
|---|---|---|---|---|---|---|
| name | con | CREATE TABLE | Input value | | | ServerConnect.createTable.lineNr20 |
| name | con | INSERT INTO | Input value | | | ServerConnect.insertSalary.lineNr46 |
| addr | con | INSERT INTO | Input value | | | ServerConnect.insertSalary.lineNr46 |
| salary | con | INSERT INTO | Input value | | | ServerConnect.insertSalary.lineNr46 |
| hours | con | INSERT INTO | Input value | | | ServerConnect.insertSalary.lineNr46 |
| quota | con | INSERT INTO | Input value | | | ServerConnect.insertSalary.lineNr46 |
| ... | ... | ... | ... | ... | ... | ... |
| name | con | SELECT | Input value | == | name | ServerConnect.getAverageSalary.lineNr92 |
| salary | con | SELECT | Output value | + | salary | ServerConnect.getAverageSalary.lineNr98 |
| ... | ... | ... | ... | ... | ... | ... |
| salary | con | SELECT | Output value | / | hour | ServerConnect.getHourlyWage.lineNr110 |
| hour | con | SELECT | Output value | / | salary | ServerConnect.getHourlyWage.lineNr110 |
| name | con | SELECT | Input value | == | name | ServerConnect.getHourlyWage.lineNr110 |
| ... | ... | ... | ... | ... | ... | ... |

Fig. 13

| Data Attribute (1501) | Dependency (1502) | API (1503) | Add | Multiply | Subtract | Divide (1504) | Index |
|---|---|---|---|---|---|---|---|
| uuid | | 1- StoreValueToDB | | | | | x |
| | | 2- ReadValueFromDB | | | | | |
| | | 3- UpdateValueInDB | | | | | |
| timestamp | | 1- StoreValueToDB | | | | | |
| | | 4- CreateFraudModel | x | x | | x | |
| | | 6- DoTransaction | x | | x | | |
| | | ... | | | | | |
| name | | 1- StoreValueToDB | | | | | |
| | | 3- UpdateValueInDB | | | | | |
| | | 5- GetFraudPrediction | x | x | | | |
| | | ... | | | | | |
| amount | addr | 5- GetFraudPrediction | x | x | x | | |
| | | 6- DoTransaction | x | | x | | |
| addr | amount, country | 1- StoreValueToDB | | | | | |
| | | 5- GetFraudPrediction | | x | x | | |
| | | 7- FilterTransactions | x | x | x | x | |

Fig. 14

EXECUTING REMOTELY A DATA PROCESSING APPLICATION

BACKGROUND OF THE INVENTION

The present invention relates to the field of digital computer systems, and more specifically, to a method for executing remotely a data processing application.

The digital age has brought about a significant increase in the volume of data being generated, stored, and processed. This data, often containing sensitive and confidential information, is typically stored and processed on computer networks. Consequently, the security of these networks and the data they contain has become a critical concern.

SUMMARY

Various embodiments provide a method for executing remotely a data processing application, computer program product and system as described by the subject matter of the independent claims. Advantageous embodiments are described in the dependent claims. Embodiments of the present invention can be freely combined with each other if they are not mutually exclusive.

In one aspect, the invention relates to a method a method for remotely executing on a remote system a data processing application using data, the method comprising: identifying using the data processing application data attributes of the data and operations on the identified data attributes; using the identified operations of the identified data attributes for determining encryption configurations for the data attributes, the encryption configuration of the data attribute indicating whether the data attribute is to be encrypted and an encryption algorithm in case the data attribute is to be encrypted, resulting in one or more first data attributes of the data attributes to be encrypted, and one or more second attributes of the data attributes not to be encrypted; executing the data processing application on the remote system, the executing comprising executing a data provision method, the data provision method comprising: encrypting values of the first data attributes according to the respective encryption algorithm; sending encrypted values and unencrypted values of the data attributes to the remote system.

In one aspect the invention relates to a computer program product comprising a computer-readable storage medium having computer-readable program code embodied therewith, the computer-readable program code configured to implement the method of the above embodiment.

In one aspect the invention relates to a local system for remotely executing on a remote system a data processing application using data stored on the local system. The local system is configured for: identifying using the data processing application data attributes of the data and operations on the identified data attributes; using the determined operations of the identified data attributes for determining encryption configurations for the data attributes, the encryption configuration of the data attribute indicating whether the data attribute is to be encrypted and an encryption algorithm in case the data attribute is to be encrypted, resulting in one or more first data attributes to be encrypted, and one or more second attributes not to be encrypted; causing execution of the data processing application on the remote system, wherein the causing of the execution comprises executing a data provision method comprising: encrypting values of the first data attributes according to the respective encryption algorithm; sending encrypted values and unencrypted values of the data attributes to the remote system.

BRIEF DESCRIPTION OF THE SEVERAL VIEWS OF THE DRAWINGS

In the following embodiments of the invention are explained in greater detail, by way of example only, making reference to the drawings in which:

FIG. 5 is a flowchart of a method for remotely executing on a remote system a data processing application in accordance with an example of the present subject matter.

FIG. 7 is an example source code of the data processing application.

FIG. 9 is an example source code of the data processing application.

FIG. 10 is an example application programming interface (API) listing data attributes and associated operations.

FIG. 13 depicts a table comprising example results of the analysis of the data processing application by the local system.

FIG. 14 depicts a table comprising example of metadata which is provided by the remote system for describing the service provided by the remote system.

DETAILED DESCRIPTION

Figure 1:
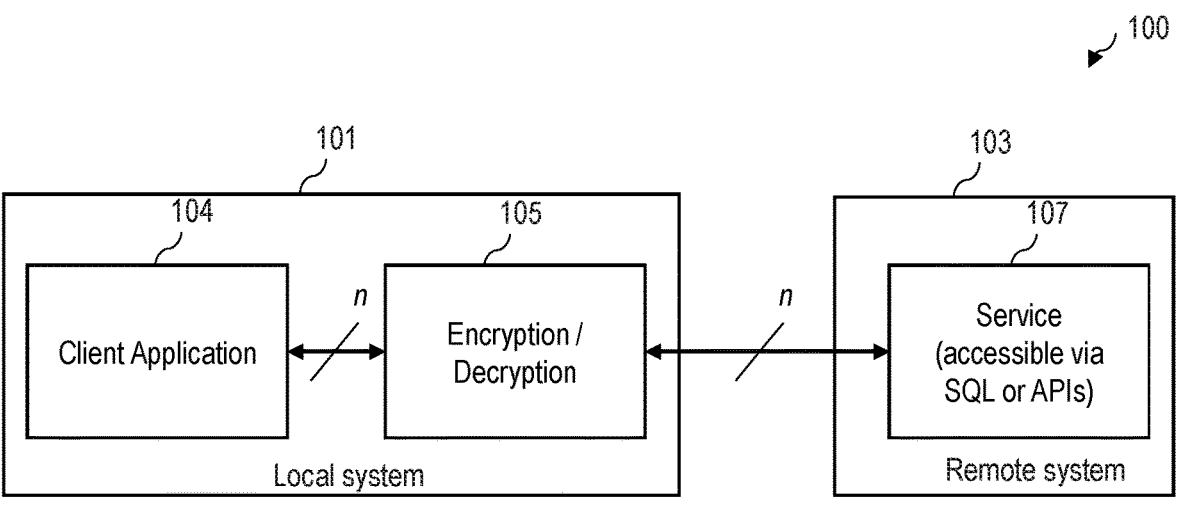
FIG. 1 is a block diagram of a computer system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may allow for a dynamic and context-aware selection of encryption configurations. By considering the operations performed on the data attributes and their involvement in the data processing application, the method may select the most suitable encryption algorithm for each data attribute. This may particularly be beneficial in complex systems where data attributes may be used in different contexts and operations, requiring different levels of security and computational efficiency. For instance, data attributes used in API calls may require a higher level of security due to their exposure to external systems, thus necessitating a more robust encryption algorithm. On the other hand, data attributes not involved in API calls may be encrypted with a more computationally efficient algorithm to optimize system performance. This method may, therefore, provide a flexible and efficient approach to data encryption in remote systems, addressing the challenges posed by the diverse range of available encryption algorithms and their varying pros and cons.

The data processing application may be an application. The data processing application may be an application program that performs a specific task. The data processing application may, for example, be stored in the local system. The present subject matter may make use of the remote system to perform the specific task. For that, remote services provided by the remote system may be used. A remote service may be a service provided by the remote system. In one example, the local system may build the service and then send the service to the remote system (e.g., of a cloud provider) for hosting. The remote service may allow users to access and manage resources of the remote system remotely through a communication network such as the Internet. The remote service may enable for example to store data on the remote system, update existing data on the remote system and process data on the remote system. The remote system may, for example, provide one or more remote services that enable to execute the data processing application. The remote service may provide service calls that enable access to functionalities of the remote service. The data processing application may comprise instructions that enable to connect to the remote system and to perform service calls of one or more remote services of the remote system. The service calls may enable to execute the specific task of the data processing application remotely. The service call may for example be a request of one or more service functionalities.

The specific task of the data processing application may include the processing of data. For that, the specific task of the data processing application may, for example, require the submission of data from the local system to the remote system. The specific task may, in another example, further require the reception of data at the local system from the remote system. The data may be structured data. The structured data may refer to data that is organized in a predefined format or schema, making it easier to process, analyze, and understand. The structured data may, for example, comprise one or more database tables. The structured data may, for example, comprise data attributes. The data attributes may represent specific properties associated with an entity or object e.g., for an entity being employee, the data attributes may be the salary, the name etc.

The program code of the data processing application may comprise operations that enable to perform the specific task of the data processing application. The operation may refer to an action or function that is performed to accomplish a specific goal or manipulate data. The operation may involve various actions such as inputting data, processing data, outputting results, storing data, or controlling program flow.

In the program code, the operations may be represented by specific instructions or statements that specify the desired action to be performed. These instructions may include, for example, arithmetic operations, logical operations, assignment operations or control flow operations. Each operation in the data processing application may reference zero or more data attributes of the data in order to perform the respective function.

The present subject matter may secure the execution of the data processing application by controlling exchange of data between the local system and the remote system. For that, the data attributes which are used by the data processing application may be identified. This may, for example, be performed by parsing the program code of the data processing application. Alternatively, a user input may be received, wherein the input indicates the data attributes of the data processing application. Furthermore, the operations which reference the identified data attributes may be identified. This may, for example, be performed by parsing the program code of the data processing application. Alternatively, the received user input may indicate the operations referencing the data attributes of the data processing application. In one example, the identification of the data attributes and the operations referencing them may be performed in "one go" e.g., in parallel or the data attributes may first be identified and after that the corresponding operations may be identified.

In one example, the identification of the of the data attributes and the operations referencing them may be performed using a code analyzer. The code analyzer may, for example, reside on a trusted 3rd party server.

For each identified data attribute of the identified data attributes an encryption configuration may be determined. The encryption configuration of the data attribute may indicate whether the data attribute is to be encrypted or not to be encrypted. In case the data attribute is to be encrypted, the encryption configuration may further indicate the encryption algorithm to be used for encrypting values of the data attribute. For example, a configuration file may be provided, wherein the configuration file may list the data attributes and associated encryption configurations e.g., as a table. In one example, in case two or more data attributes are involved in one calculation, then the same encryption configuration may be used for these data attributes. The calculation may, for example, be the sum or another function of the attributes.

Thus, the determination of the encryption configurations may result in a first subset of the identified attributes that needs to be encrypted and a remaining second subset of attributes of the identified attributes that do not need an encryption. The first subset of data attributes may be referred to as first data attributes and the second subset of data attributes may be referred to as second data attributes.

The encryption configurations may be used during execution of the data processing application. The data processing application may be executed on the remote system. For example, the execution of the instructions of the data processing application on the remote system may be triggered or initiated by the local system. The execution of the data processing application may require the submission of values of at least part of the identified data attributes. Thus, during the execution of the data processing application, values of the data attributes may need to be sent by the local system to the remote system. In this case, the values of the first data attributes are encrypted using associated encryption algorithm and the encrypted values of the first data attributes are sent to the remote system. The values of the second data attributes are not encrypted and thus sent unencrypted to the remote system. The encryption of the first data attributes values and the submission of the encrypted values and the value of the second data attributes may form the data provision method.

In one example implementation of the data provision method, the local system and the remote service may use an authorization scheme so that only, the remote service may accept encrypted data if the local system is the right client.

In one example implementation of the data provision method, if a first attribute is part of the program code but its value is not sent to the remote system; rather it is used at the remote system, then the data provision method may further comprise the submission of an information to the remote system indicating the first attribute and its encryption configuration so that the remote system may encrypt that first attribute value before sending it (e.g., as part of a result of the data processing application) to the local system.

In one example implementation of the data provision method, instead of the local system sending the data encrypted all at once, it may send a processing request to the remote system, and the remote system may then request the required data and its encrypted format from the local system.

According to one example, the method further comprises: receiving by the local system, one or more results of the data processing application from the remote system. The one or more results may be the results of execution respective instructions (e.g., SQL statements) of the data processing application. For example, the local system may be configured to assign each received result to the corresponding instruction or request (e.g., SQL statement). The result may comprise values of one or more attributes which are encrypted in accordance with the encryption configurations of the one or more attributes. This result may be associated a read or selection instruction. The local system may use the encryption configurations associated with the one or more attributes of the result for decrypting the received values. Alternatively, or additionally, the result may be a result of a computation (e.g., sum or other functions) of multiple attributes. In this case, since the multiple attributes are encrypted with the same encryption configuration, the local system may use that encryption configuration to decrypt the result. For example, if multiple attributes a1, a2 and a3 are all involved in one computation, then all of them may be encrypted using the same encryption scheme (e.g., "En1"). After the computations are done at the remote system, the result is also received encrypted according to "En1". The local system may know that the result is encrypted with "En1" because it forwarded the SQL and/or API to the remote system.

According to one example, the data provision method is executed by an encryption-decryption proxy. The execution of the data processing application comprises sending requests by the local system to the remote system and execution of the requests at the remote system. The requests comprise attribute values and operations. The data provision method comprises: intercepting the requests by the encryption-decryption proxy, modifying intercepted requests which comprise first data attributes to include the encrypted values, wherein the sending comprises sending the intercepted requests, after modification, to the remote system. The use of the encryption-decryption proxy may provide several advantages. It may offload the computational burden of encryption and decryption from the local system, which can be particularly beneficial if the local system has limited computational resources. For instance, if the local system is a mobile device with a low-power processor, the encryption-decryption proxy can perform the computationally intensive encryption and decryption processes, thereby conserving the local system's resources and improving its performance.

According to one example, the encryption-decryption proxy receives from the remote system encrypted results of the data processing application. The encryption-decryption proxy may decrypt the encrypted results in accordance with the encryption configurations. The encryption-decryption proxy may send to the local system the unencrypted results. This example may enable to secure access to data in both directions to or from the remote system. The encryption-decryption proxy may thus act as a translator between the local system and the remote system. Either the encryption-decryption proxy has information about the metadata of each API call or SQL statement, or the local system may register the APIs or the SQL statements with the encryption-decryption proxy. This may enable the encryption-decryption proxy to apply the right encryption and decryption to the first attribute. The encryption-decryption proxy may set the encryption algorithm for values of the first attributes and thereby use the appropriate decryption algorithm for values of the first attributes that are returned by the remote service. For example, if multiple attributes a1, a2 and a3 are all involved in one computation, then all of them may be encrypted using the same encryption scheme (e.g., "En1"). After the computations are done at the service side, the result is also received encrypted according to "En1". The proxy or the local system may know that the result is encrypted with "En1" because it forwarded the SQL and/or API to the service. And the local system may register the SQL/API call response with the proxy that the result is coming back encrypted with "En1".

In another example, the local system and remote system may use a shared space to exchange encrypted data and results.

According to one example, the encryption-decryption proxy is part of the local system. Alternatively, the encryption-decryption proxy is remotely connected to the local system and the remote system, wherein the encryption-decryption proxy may be a 3rd party server.

According to one example, the determination of the encryption configuration for the data attribute comprises: determining whether the operation on the data attribute includes one or more other data attributes of the data attributes, wherein the data attribute and the one or more other data attributes are referred to as data attribute set. If the operation on the data attribute does not include one or more other data attributes of the data attributes, a first encryption selection method may be performed for determining the encryption configuration the data attribute. If the operation on the data attribute includes one or more other data attributes of the data attributes, it may be determined whether a data attribute of the data attribute set is used in an API call for the data processing application. If the data attribute set includes a data attribute which is used in an API call, a second encryption selection method may be performed for determining the encryption configuration for the data attribute set. If no data attribute of the data attribute set is used in an API call, it may be determined that each data attribute of the data attribute set is to be encrypted with a selected homomorphic encryption algorithm. The homomorphic encryption algorithm may, for example, be a fully homomorphic (FHE) encryption algorithm.

The homomorphic encryption may be a form of encryption that allows computations to be performed on encrypted data without first having to decrypt it. The resulting computations are left in an encrypted form which, when decrypted, result in an output that is identical to that produced had the operations been performed on the unencrypted data. The fully homomorphic encryption may allow the evaluation of arbitrary circuits composed of multiple types of gates of unbounded depth and is the strongest notion of homomorphic encryption.

The fully homomorphic encryption algorithms may be grouped into generations corresponding to the underlying approaches such as the First-generation FHE, FHE-1, the Second-generation FHE, FHE-2, the Third-generation FHE, FHE-3 and the Fourth-generation FHE, FHE-4.

The normal encryption algorithm may be configured to transform plaintext into ciphertext using a specific encryption key. The ciphertext may only be decrypted back into plaintext using the corresponding decryption key. The normal encryption algorithm may not be a homomorphic encryption algorithm. Examples of normal encryption algorithms include Advanced Encryption Standard (AES), RSA, and Triple Data Encryption Standard (3DES).

This example may allow for a dynamic and context-aware selection of encryption configurations. By considering the operations performed on the data attributes and their involvement in API calls, the method can select the most suitable encryption algorithm for each data attribute. This may particularly be beneficial in complex systems where data attributes may be used in different contexts and operations, requiring different levels of security and computational efficiency. For instance, data attributes used in API calls may require a higher level of security due to their exposure to external systems, thus necessitating a more robust encryption algorithm. On the other hand, data attributes not involved in API calls may be encrypted with a more computationally efficient algorithm to optimize system performance on the local system and/or encryption-decryption proxy. This method, therefore, may provide a flexible and efficient approach to data encryption in remote systems, addressing the challenges posed by the diverse range of available encryption algorithms and their varying pros and cons.

According to one example, the first encryption selection method comprises: determining whether the operation on the data attribute comprises a calculation involving the data attribute. If the operation on the data attribute comprises a calculation involving the data attribute, it may be determined that the data attribute is to be encrypted with a selected homomorphic encryption algorithm. If the operation on the data attribute does not comprise a calculation involving the data attribute, it may be determined whether the data attribute is classified as critical attribute according to a classification policy. If the data attribute is classified as critical attribute, it may be determined that the data attribute is to be encrypted with a selected normal encryption algorithm. If the data attribute is not classified as critical attribute, it may be determined that the data attribute is not to be encrypted. The first encryption selection method may determine encryption configurations for data attributes which are used individually, e.g., which are not used together with other attributes. The homomorphic encryption algorithm may, for example, be a fully homomorphic (FHE) encryption algorithm.

This example may take into account the specific operations performed on the data attribute on the remote system. By considering whether a calculation is involved in the operation, the method can determine whether a fully homomorphic encryption algorithm, which may allow computations to be performed on encrypted data. This may particularly be beneficial in scenarios where the data attribute is involved in complex computations that need to be performed in an encrypted state for security reasons. Furthermore, by considering the classification of the data attribute according to a policy, the method can determine the appropriate level of encryption for the data attribute. For instance, critical attributes may require a higher level of security and thus a more robust encryption algorithm, while non-critical attributes may not require encryption at all. This method, therefore, may provide a flexible and context-aware approach to encryption selection, addressing the challenges posed by the diverse range of available encryption algorithms and their varying pros and cons.

According to one example, the second encryption selection method comprises for each data attribute of the data attribute set: determining whether the operation on the data attribute is one operation of a list of operations, wherein the list of operations consists of a read operation, a write operation and a delete operation. If the operation on the data attribute is the one operation, it may be determined whether the data attribute is classified as critical attribute according to the classification policy. If the data attribute is classified as critical attribute, it may be determined that the data attribute is to be encrypted with a selected normal encryption algorithm. If the data attribute is not classified as critical attribute, it may be determined that the data attribute is not to be encrypted. If the operation on the data attribute is not one of the list of operations, it may be determined whether the data attribute is dependent on another data attribute. If the data attribute is dependent on another data attribute, it may be determined that the data attribute set is to be encrypted with a selected homomorphic encryption algorithm and the remaining non processed data attributes of the data attribute set may be skipped since the same encryption is defined for the data attribute set based on the currently processed data attribute. If the data attribute is not dependent on another data attribute, it may be determined that the data attribute is to be encrypted with a selected homomorphic encryption algorithm. The homomorphic encryption algorithm may, for example, be a fully homomorphic (FHE) encryption algorithm.

This example may provide a flexible and efficient method for determining the encryption configurations for data attributes based on their operations and classifications. This method may allow for the automatic selection of the most suitable encryption algorithm for each data attribute, taking into account the specific operations that might be performed on the data attribute and whether the data attribute is classified as critical. This approach may address the problem of many available encryption algorithms, each with its own pros and cons, such as security, compute resources, and added latency. By considering the operations and classifications of the data attributes, the method can automatically select the most efficient encryption algorithm for each data attribute, thereby saving development time and costs, and reducing time-to-market of critical, large applications.

In one example, for encryption algorithm selection, the local system may consider the data attributes in each API separately, or consider the same data attributes across all APIs. That is, the encryption algorithm may be selected for the data attribute for all APIs to which it belongs or selected for the data attribute per API to which it belongs.

According to one example, the encryption algorithm which is to be used for encryption of the data attribute is a selected homomorphic encryption algorithm or a selected normal encryption algorithm. The homomorphic encryption algorithm may, for example, be a fully homomorphic (FHE) encryption algorithm. The selection of the homomorphic encryption algorithm is performed using a client policy and/or service policy, wherein the client policy is defined by the local system and the service policy is defined by the remote system. The selection of the normal encryption algorithm is performed using a client policy and/or service policy.

This example may provide a method for selecting the encryption algorithm for a data attribute based on a client policy and/or service policy. This method may allow for the automatic selection of the most suitable encryption algorithm for each data attribute, taking into account the specific policies defined by the local system and the remote system. This approach may address the problem of many available encryption algorithms, each with its own pros and cons, such as security, compute resources, and added latency. By considering the client policy and/or service policy, the method can automatically select the most efficient encryption algorithm for each data attribute, thereby saving development time and costs, and reducing time-to-market of critical, large applications.

In one example, the client policy and/or service policy to select the encryption algorithm may be agreed upon by both the service and the local system beforehand.

In one example, the client policy may require the use of techniques similar for multi-party homomorphic encryption to encrypt the individual data attributes.

According to one example, the method further comprises: sending by the local system to the remote system a list of encryption algorithms being available at the local system and the identified data attributes and corresponding operations. In response to the sending, the local system may receive from the remote system the service policy.

This example may allow for a dynamic and adaptable encryption process. The local system may communicate its capabilities and preferences to the remote system, which can then tailor its service policy accordingly. This may ensure that the most efficient and suitable encryption algorithm is used for each data attribute, taking into account the specific operations that will be performed on the data. This feature may particularly be beneficial in a cloud computing environment, where the local system and the remote system may have different computational resources and capabilities.

According to one example, the service policy is provided as a rank matrix which ranks the encryption algorithms for different combinations of data attributes and operations. This example may provide a clear and systematic way of selecting the most suitable encryption algorithm for each data attribute. The rank matrix may take into account various factors, such as the security level of the encryption algorithm, the computational resources required for the encryption and decryption processes, and the latency added by the encryption process. This may allow for a more informed and efficient selection of encryption algorithms, which can lead to improved performance and security of the data processing application.

In one example, the local system may initiate the creation of the rank matrix and shares it with the remote system for finalizing. In another example, the service of the remote system might already have pre-calculated the rank matrix and pre-compiled different versions of the program using different FHE algorithms, and deploy the program required by the local system. The service may create the final encryption/FHE used for each data attribute, and the local system's policy may be to completely trust the service's suggested encryption/FHEs. The selected encryption/FHE may be for the complete API set or for each individual API.

According to one example, the encryption algorithm which is to be used for encryption of the data attribute is a selected fully homomorphic encryption algorithm or a selected normal encryption algorithm. The selection of the fully homomorphic encryption algorithm comprises: step a) selecting a fully homomorphic encryption algorithm of a set of fully homomorphic encryption algorithms, step b) determining whether the fully homomorphic encryption algorithm supports the operation on the data attribute, step c) if the fully homomorphic encryption algorithm supports the operation on the data attribute, evaluating a performance of the fully homomorphic encryption algorithm for encryption of the data attribute and going back step to step a) for processing a next fully homomorphic encryption algorithm; step d) if the fully homomorphic encryption algorithm does not support the operation on the data attribute, going back to step a) for processing a next fully homomorphic encryption algorithm. After selecting all the fully homomorphic encryption algorithms, the fully homomorphic encryption algorithm having the best performance value may be provided. If no performance value is computed, a predefined reference encryption algorithm may be provided or a user may be requested to provide the fully homomorphic encryption algorithm.

The selection of the normal encryption algorithm comprises: step a) selecting a normal encryption algorithm of a set of normal encryption algorithms, step b) determining whether the normal encryption algorithm supports the operation on the data attribute, step c) if the normal encryption algorithm supports the operation on the data attribute, evaluating a performance of the normal encryption algorithm for encryption of the data attribute and going back step to step a) for processing a next normal encryption algorithm; step d) if the normal encryption algorithm does not support the operation on the data attribute, going back to step a) for processing a next normal encryption algorithm. After selecting all the normal encryption algorithms, the normal encryption algorithm having the best performance value may be provided. If no performance value is computed, a predefined reference encryption algorithm may be provided or a user may be requested to provide the normal encryption algorithm. The best performance value may be defined according to the service policy and/or client policy.

This example may allow for a more flexible and adaptable encryption process. The method may dynamically select the most suitable encryption algorithm based on the specific operations that will be performed on the data and the performance of the encryption algorithms. This can lead to improved efficiency and security of the data processing application.

According to one example, the performance indicates at least one of: a CPU usage, a memory usage, end-to-end latency or a security level. This example may provide a comprehensive evaluation of the performance of the encryption algorithms. By considering various performance indicators, such as CPU usage, memory usage, end-to-end latency, and security level, the method may select the most efficient and secure encryption algorithm for each data entity. This may lead to improved performance and security of the data processing application.

In one example, the selection of the encryption algorithm may be performed based on a criterion which is defined using at least one of the constraints: client-side performance, minimally selected encryption, hardware scoped encryption, security focused encryption, constrained encryption or system agnostic encryption. The constraint "client-side performance" may require the algorithm with the most performance on the client-side. The performance may include at least one of: SLA/QOS requirements, available encryption hardware accelerators, the number of cycles required to process an encryption/decryption, or the end-to-end latency of API with encryption/FHE. The constraint "minimally selected encryption" may require the encryption/FHEs that results in the least number of performant encryption/FHEs being used at the client-side. For example, it may require only FHE-2 for all data attributes. This can be helpful if the encryption/decryption is using hardware engines at the client-side. The constraint "hardware scoped encryption" may require the encryption/FHEs for which hardware accelerators are available on the client-side. This may save CPU cycles for other work. This may also improve performance in case of overcommitment. The constraint "security focused encryption" may require the encryption/FHE with the best security and ignore everything else. The constraint "constrained encryption" may require the first encryption/FHEs which only result in a percentage (x %) increase in CPU and percentage (y %) increase in memory. The constraint "feature system-agnostic encryption" may require the algorithm for each data attribute. For example, some data attributes are encrypted with FHE, some with encryption and some not at all. For example, the client may use different filters for selecting, e.g., encrypt all with AES-256 except, FHE for these and for else.

According to one example, identifying the data attributes and the operations is performed by at least: parsing a program code that implements the data provision method, and in case the program code comprises API calls parsing metadata provided by the remote system, wherein the metadata describes APIs provided by the remote system. This example may allow for a more accurate and efficient identification of the data attributes and operations. By parsing the program code and the metadata provided by the remote system, the method can accurately identify the data attributes and operations, which can lead to a more efficient and secure encryption process.

According to one example, the method is automatically performed in response to deploying the data processing application or in response to an update of the data processing application and/or the data provision method. This example may allow for a more responsive and adaptable encryption process. The method can automatically adjust the encryption process based on the deployment or update of the data processing application, which can lead to improved efficiency and security of the data processing application.

In one example, if at least of the policies change, the method may automatically be performed. For example, a customer may send a request for a change of encryption/FHE policy.

According to one example, the data processing application and/or data provision method is provided as a cloud service, wherein the remote system and/or local system are part of the cloud. This example may allow for the scalability and flexibility of cloud computing to be leveraged. The cloud-based nature of the system may allow for easy deployment and management of the data processing application and data provision method. This may particularly be beneficial in large-scale applications where managing individual systems can be cumbersome and inefficient. Furthermore, the cloud-based system may provide cost savings, as it eliminates the need for purchasing and maintaining physical servers and other hardware.

According to one example, the remote system is an untrusted system and the local system is a trusted system. The untrusted system may refer to a system that is not considered reliable or trustworthy because the system may not adhere to expected behavior, security standards, or privacy requirements. This example may allow for the secure processing of data in environments where the trustworthiness of the remote system cannot be guaranteed. The local system may perform operations on the data in a secure manner, ensuring that the data remains confidential and integrity is maintained. This may particularly be important in applications where sensitive data is being processed, such as in healthcare or financial services. The use of a trusted local system may also allow for the implementation of robust access control mechanisms, further enhancing the security of the system.

According to one example, the normal encryption algorithm is a non-homomorphic encryption algorithm. This example may allow for the efficient encryption of data without the computational overhead associated with homomorphic encryption algorithms. Non-homomorphic encryption algorithms may provide strong security while also ensuring that the system may remain performant, even when processing large amounts of data. This may particularly be beneficial in applications where speed and efficiency may be critical, such as in real-time data processing or high-volume data analytics.

According to one example, the data processing application is configured to store data and/or read data and/or update data on the remote system. This may allow for the efficient management of data across the system. The data processing application may perform a variety of operations on the data, including storing new data, reading existing data, and updating data as necessary. This may provide a flexible and robust framework for managing data, which can be particularly beneficial in applications where data is frequently updated or accessed.

According to one example, the local system may use another local system to control execution of a part of the data processing application. For example, part of the data attributes may be generated on one local system and the other part on the other local system. For example, the encrypt/decrypt proxy of each local system might be different, and therefore, their policies will select different encryption/FHEs for independent data attributes.

FIG. 1 illustrates a computer system 100 in accordance with an example of the present subject matter. The computer system 100 comprises a local system 101 and a remote system 103. The local system 101 may be configured to communicate with the remote system 103 via one or more networks. For example, the network may include, but is not limited to, a cable network, an optical fiber network, a hybrid fiber coax network, a wireless network (e.g., a Wi-Fi and/or mobile telephone network), a satellite network, the Internet, an intranet, a local area network, any other suitable network, and/or any combination of these networks.

Figure 3:
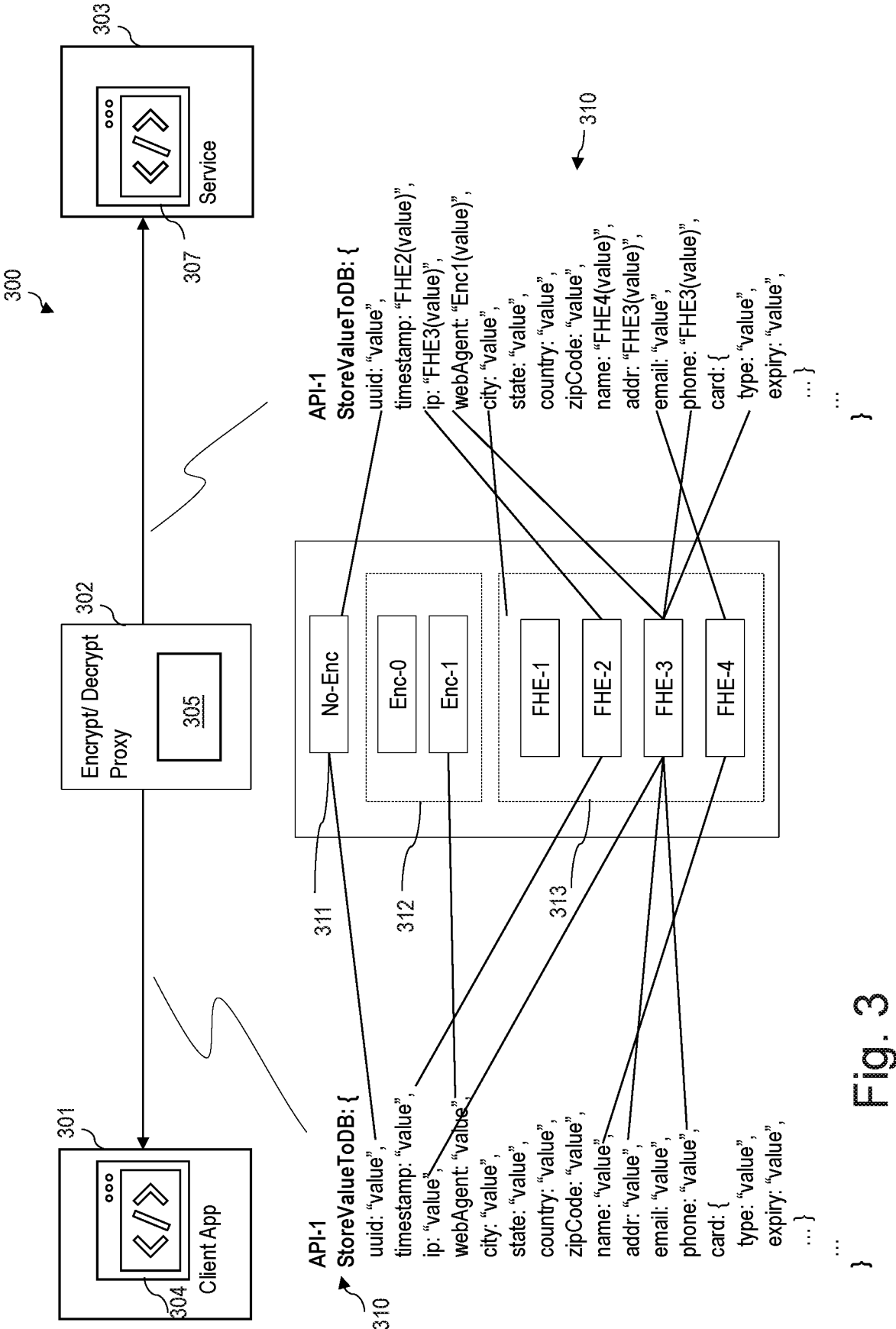
FIG. 3 is a block diagram of a computer system in accordance with an example of the present subject matter.

As shown, the local system 101 may include an application 104 and a component 105 that performs encryption and decryption. The local system 101 may, for example, be a client of the remote system 103, and thus the application 104 may be referred to as a client application. The application may, for example, be a data processing application for processing data. Although the component 105 is shown as being part of the local system 101; however, the present subject method is not limited to, as the component 105 may not be part of the local system 101. FIG. 3 shows an example implementation in which the component 105 is not part of the local system.

The remote system 103 may enable the local system 101 to access resources of the remote system 103 by providing services such as the service 107. The service 107 may be accessed via SQLs and/or APIs.

Figure 2:
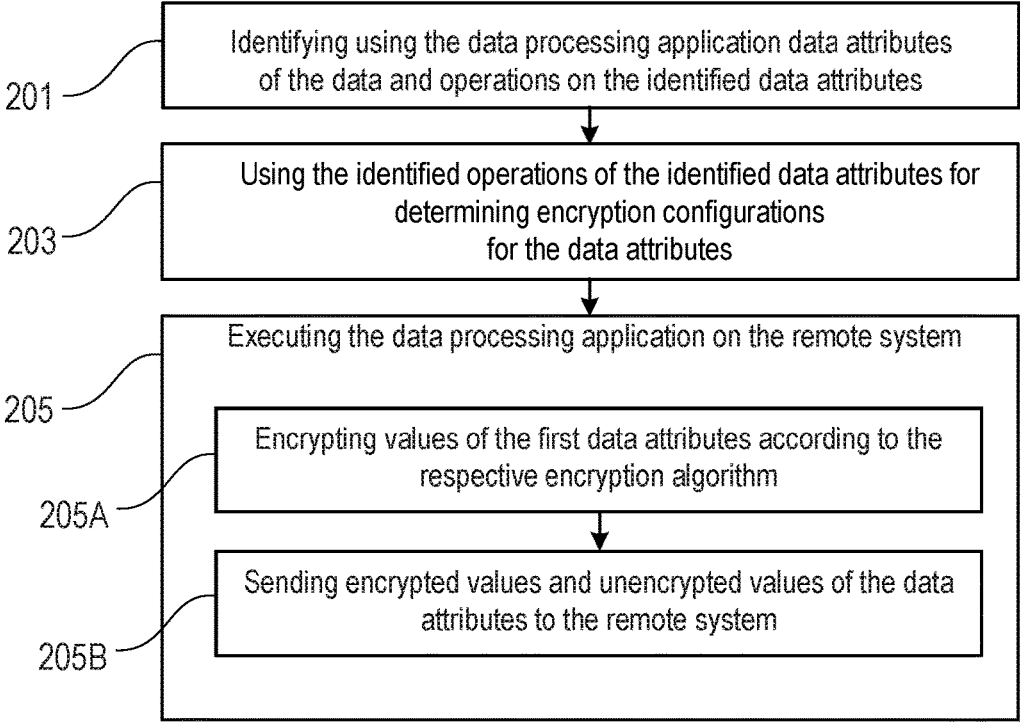
FIG. 2 is a flowchart of a method for executing remotely a data processing application in accordance with an example of the present subject matter.

FIG. 2 is a flowchart of a method for remotely executing on a remote system a data processing application using data. For the purpose of explanation, the method described in FIG. 2 may be implemented in the system illustrated in FIG. 1, but is not limited to this implementation. The method of FIG. 2 may, for example, be performed by the local system 101 in order to execute the data processing application 104 on the remote system 103.

The data processing application may be used in step 201 in order to identify data attributes of the data and operations on the identified data attributes.

If, for example, the source code of the data processing application comprises statements as shown in FIG. 7, the local system may parse the source code and identify service calls or requests such as "insertSalary" and "getHighSalary". The local system may further determine whether data attributes are used in each service call. For example, in service call "insertSalary" the data attributes "name", "addr", "sales", "salary", "hours" and "quota" may be identified. In addition, the local system may identify the operations performed on the data attributes. For example, for data attribute "salary", the write and selection operations may be identified. The operation of selection of the data attribute "salary" may comprise a calculation which is the sum and the division.

If, for example, the source code of the data processing application comprises API calls as shown in FIG. 9, the local system may parse the source code and the service metadata e.g., as shown in FIG. 14, to identify the data attributes "uuid", "timestamp", "ip", "webAgent" and "city" and the corresponding operations. For example, as shown in FIG. 10, the data attribute "uuid" is associated with the read, write and delete operations, and these operations do not involve any calculation.

The identified operations and the identified data attributes may be used in step 203 for determining encryption configurations for the data attributes. The encryption configuration of each data attribute indicates whether the data attribute is to be encrypted. The encryption configuration may further indicate an encryption algorithm in case the data attribute is to be encrypted. This step may result in one or more first data attributes of the data attributes to be encrypted, and one or more second attributes of the data attributes not to be encrypted.

The data processing application may be executed remotely on the remote system in step 205. The execution step 205 may comprise steps 205A and 205B. In step 205A, values of the first data attributes are encrypted according to the respective encryption algorithm. In step 205B, encrypted values and unencrypted values of the data attributes are sent to the remote system. Steps 205A and 205B may be steps of the data provision method.

If, for example, the source code of the data processing application comprises SQL statements as shown in FIG. 7, and for executing the second SQL statement SQL-2, the local system 101 may call the service "insertSalary" which is provided by the remote system. In this service call, the local system indicates the instruction of the data processing application that should be executed by the remote system. In this example, this instruction is "INSERT INTO salarylist VALUES (name, addr, sales, salary, hours, quota . . . )" which is an instruction for storing the values of the data attributes "name", "addr", "sales", "salary", "hours" and "quota" at the remote system. The call of the service "insertSalary" further comprises the provision of the values of the data attributes: "name", "addr", "sales", "salary", "hours" and "quota" using the data provision method, e.g., values of first attributes which are to be encrypted may have to be encrypted according to the respective encryptions configurations before being sent to the remote system and values of second attributes which are not to be encrypted may be sent unencrypted to the remote system. The execution of the call of the service "insertSalary" (execution of SQL-2) may cause or trigger the remote system to execute the instruction (which is provided as argument to the service call) using the received values of the data attributes. In one example, steps 205A and 205B may be executed per SQL instruction e.g., steps 205A-B may be executed for attributes of SQL-2, then executed again for attribute "name=" of SQL-3 and so forth. For example, the source code of data processing application may be scanned and upon reading SQL-2, the local system may identify zero or more first attributes to be encrypted and zero or more second attributes that are not to be encrypted, and may encrypt the values of the first attribute(s). This may result in encrypted values of one or more first attributes and/or unencrypted values of one or more second attributes. The encrypted values together with the unencrypted values may be sent by the local system with the respective SQL-2 to the remote system. In another example, the source code of data processing application may be scanned to get all references, and to identify first attributes to be encrypted and second attributes that are not to be encrypted. Once this is identified, the first attributes of the data are pre-emptively encrypted using the encryption-decryption proxy or pre-emptively encrypted by the local system, and afterwards stored on the local system. This encrypted data and unencrypted values of the second attribute(s) may be sent by the local system with the respective SQL or API calls to the remote system.

If, for example, the source code of the data processing application comprises API calls as shown in FIG. 9, the local system and for the API-1, the local system 101 may call the cloud service "cloudService.storeValueToDB" which is provided by the remote system. In this service call, the local system indicates the function "storeValueToDB" of the data processing application that should be executed by the remote system. In this example, this function is for storing the values of the data attributes "uuid", and "timestamp" at the remote system. The call of the service "cloudService.storeValueToDB" further comprises the provision of the values of the data attributes: "uuid", and "timestamp" using the data provision method, e.g., values of first attributes which are to be encrypted may have to be encrypted according to the respective encryptions configurations before being sent to the remote system and values of second attributes which are not to be encrypted may be sent unencrypted to the remote system. The execution by the local system of the service calls using the class "ServerConnect", may cause the remote system to execute the instruction associated with the service call.

FIG. 3 illustrates a computer system 300 in accordance with an example of the present subject matter. The computer system 300 comprises a local system 301, a proxy 302 and a remote system 303. The local system 301 may be configured to communicate with the proxy 302 via one or more networks. The remote system 303 may be configured to communicate with the proxy 302 via one or more networks. For example, the network may include, but is not limited to, a cable network, an optical fiber network, a hybrid fiber coax network, a wireless network (e.g., a Wi-Fi and/or mobile telephone network), a satellite network, the Internet, an intranet, a local area network, any other suitable network, and/or any combination of these networks.

As shown, the local system 301 may include an application 304. The local system 301 may, for example, be a client of the remote system 303, and thus the application 304 may be referred to as a client application. The application may, for example, be a data processing application for processing data. The proxy 302 may comprise a component 305 that performs encryption and decryption.

The remote system 303 may enable the local system 301 to access resources of the remote system 103 by providing services such as the service 307. The service 307 may be accessed via SQLs and/or APIs. FIG. 3 shows an example API 310 which is provided by the remote system 303. The API 310 involves data attributes as listed in FIG. 3. The data attributes may include "timestamp", "uuid", "phone" etc. As shown, each data attribute of the API 310 may be associated with an encryption configuration. For example, the data attribute "uuid" is associated with an encryption configuration 311 which indicates that this data attribute is not to be encrypted. The data attribute "webagent" is associated with an encryption configuration 312 which indicates that this data attribute is to be encrypted with a normal encryption 312 such as the normal encryption algorithm Enc-0 or Enc-1. The data attribute "name" is associated with an encryption configuration 313 which indicates that this data attribute is to be encrypted with a fully homomorphic encryption 313 such as the fully homomorphic encryption algorithm of difference generations: FHE-1, FHE-2, FHE-3 or FHE-4.

As indicated in FIG. 3, the unencrypted values of the data attributes of the API 310 may be received at the proxy 302 and then encrypted using the component 305 using the encryption configurations 311-313 which are associated with the data attributes. The resulting encrypted values are then sent by the proxy 302 to the remote system 303.

Figure 4:
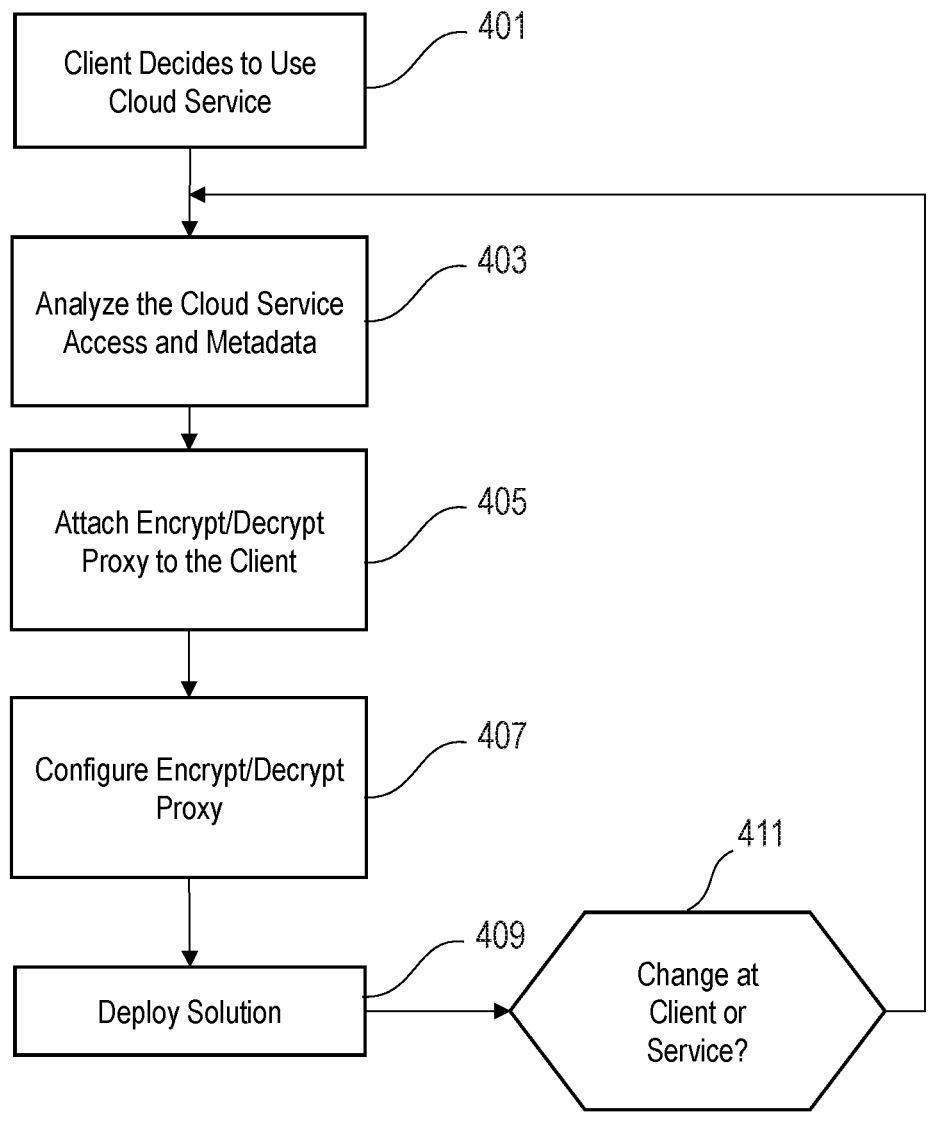
FIG. 4 is a flowchart of a method for executing remotely a data processing application in accordance with an example of the present subject matter.

FIG. 4 is a flowchart of a method for remotely executing on a remote system a data processing application. For the purpose of explanation, the method described in FIG. 4 may be implemented in the system illustrated in FIG. 3, but is not limited to this implementation. The method of FIG. 4 may, for example, be performed by the local system 301 in order to execute the data processing application on the remote system 303.

In step 401, the client 301 may decide to use service 307. The service 307 may, for example, be a cloud service. In step 403, the client 301 may analyze the cloud service access and metadata in order to identify data attributes and associated operations. The data attributes are shown in FIG. 3. In step 405, the client 301 may attach the encrypt/decrypt proxy 302 to the client 301. In step 407, the client 301 may configure the encrypt/decrypt proxy 302 according to the encryption configurations of the data attributes. In step 409, the data processing application may be deployed. The deployed application may thus be executed resulting in data transmitted from the client to the service. In case (411) a change at the client or service occurs, the method may be repeated by going back to step 403.

FIG. 5 is a flowchart of a method for remotely executing on a remote system a data processing application in accordance with an example of the present subject matter. For the purpose of explanation, the method described in FIG. 5 may be implemented in the system illustrated in FIG. 3, but is not limited to this implementation.

In step 501, the client may get a service metadata catalog for data attributes of the API. The client's sources may be analyzed in step 503 to determine where the data attributes are used. The service metadata, the output of the analyzer and the client-side policies may be used in step 505 by an intelligent algorithm individually to determine for each data attribute, whether to use no-encryption, normal encryption or fully homomorphic encryption. The algorithm may configure in step 507 an encrypt/decrypt proxy, which may encrypt each data attribute individually. The client sends in step 509 API data to the encrypt/decrypt proxy instead of sending it directly to the service. The proxy may encrypt data and send requests with the encrypted data to the service.

Figure 6:
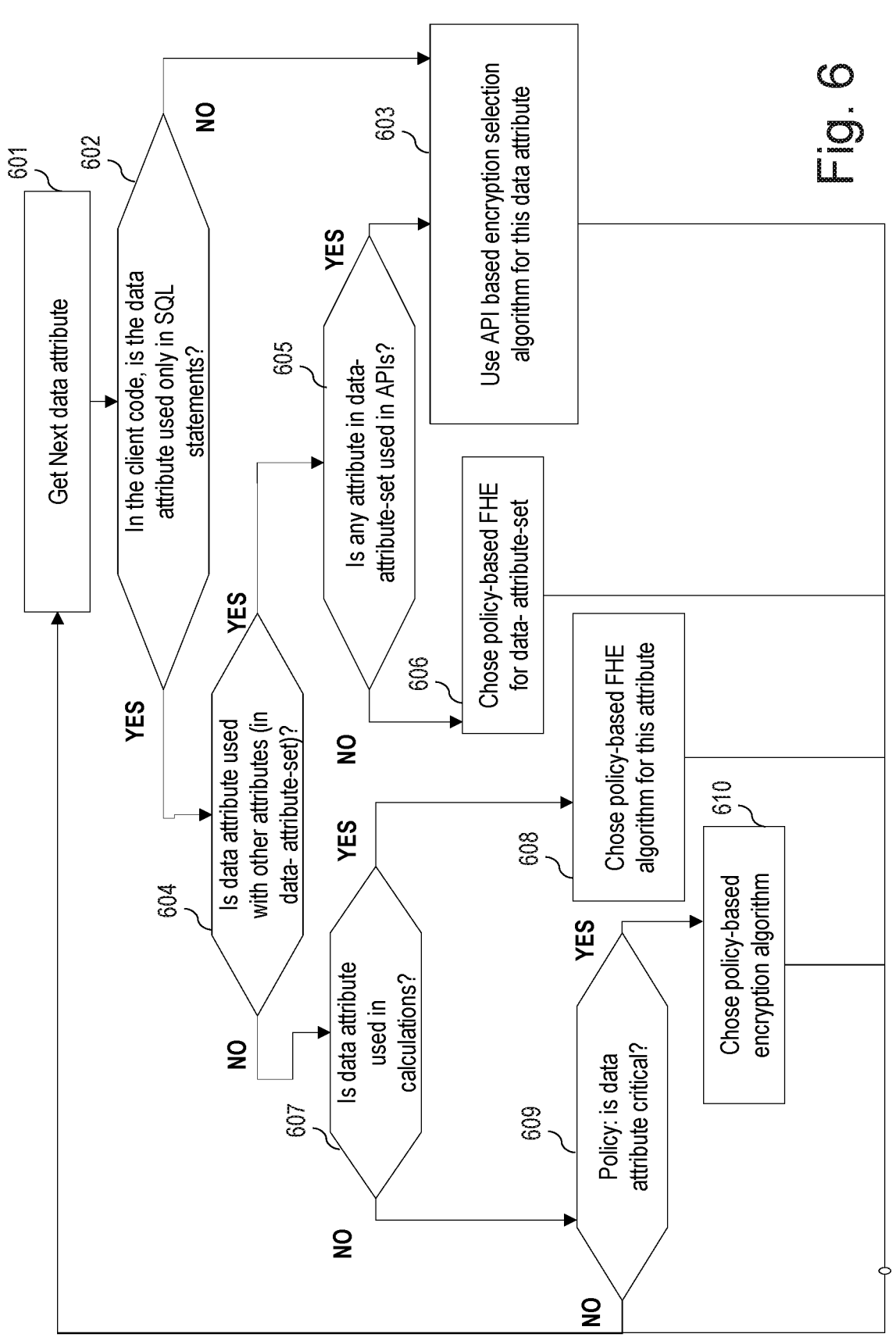
FIG. 6 is a flowchart of a method for determining encryption configurations in accordance with an example of the present subject matter.

FIG. 6 is a flowchart of a method for determining encryption configurations for the data attributes in accordance with an example of the present subject matter. For the purpose of explanation, the method described in FIG. 6 may be implemented in the system illustrated in FIG. 1 or 3, but is not limited to this implementation.

For example, the local system 101 may have identified (e.g., as described in step 201 of FIG. 2) data attributes and the operations which are performed on the data attributes. This may be performed for example by parsing the source code of the data processing application 104 and optionally using metadata descriptive of the service provided by the remote system 103. The method of FIG. 6 may be performed sequentially on the data attributes.

Figure 8:
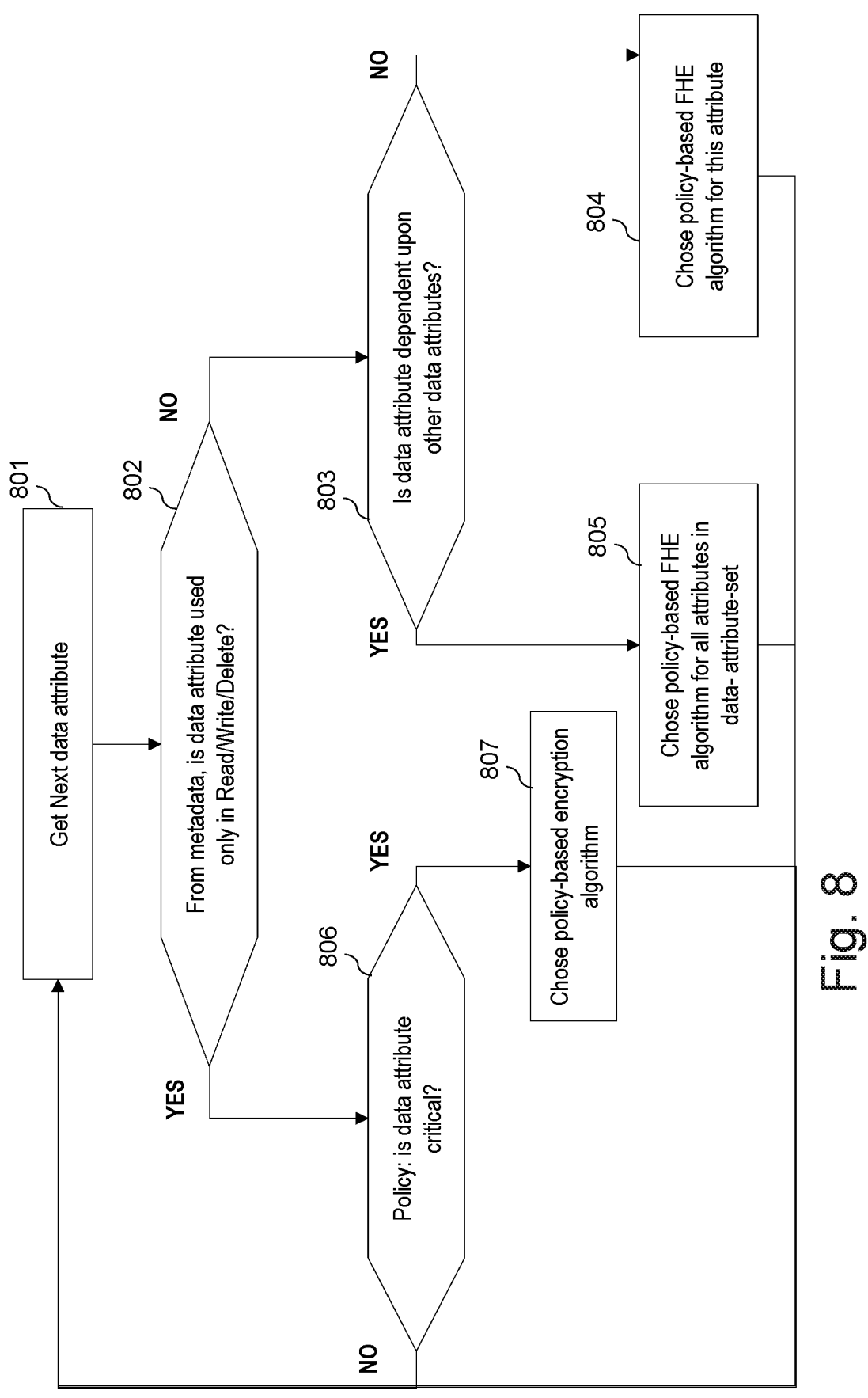
FIG. 8 is a flowchart of a method for determining encryption configurations in accordance with an example of the present subject matter.

For a current data attribute (601) of the data attributes, it may be determined in step 602 whether in the client code, the current data attribute 601 is used only in SQL statements. If the current data attribute is not used only in SQLs, an API based encryption selection algorithm may be used (e.g., as shown in FIG. 8) in step 603 for the current data attribute 601.

If the current data attribute 601 is used only in SQL, it may be determined in step 604 whether the current data attribute 601 is used with other data attributes (in a set "data-attribute-set"). If the current data attribute 601 is used with other data attributes it may be determined in step 605 whether any data attribute in data-attribute-set is used in APIs. If no data attribute of the set is used in API, the policy-based FHE may be chosen in step 606 for the hole data-attribute-set. If there is a data attribute of the set which is used in API, the API based encryption selection algorithm (e.g., as shown in FIG. 8) may be used in step 603 in order to determine the encryption configuration for the current data attribute 601 and the other attributes belonging to the data attribute set. For SQL-based service, the client may decide about encryption/FHE independently without any metadata input from the service side. Step 604 may further check if the data attribute set is already processed for a previous data attribute, and if so, the method starts again in order to process next data attribute of the identified data attributes.

If the current data attribute 601 is not used with other data attributes, it may be determined in step 607 whether the current data attribute 601 is used in calculations. If the current data attribute 601 is used in calculations, a policy-based FHE algorithm may be used in step 608 for the current data attribute. If the current data attribute 601 is not used in calculations, it may be determined in step 609 whether the current data attribute 601 is a critical attribute. If the current data attribute 601 is a critical attribute, a policy-based encryption algorithm may be chosen in step 610. If the current data attribute 601 is not a critical attribute a no encryption may be chosen for the current data attribute and the next data attribute of the identified data attributes may be processed. As shown in FIG. 6, after execution of steps 606, 608 and 610 the next data attribute of the identified data attributes may be processed.

Steps 607 to 610 may be an example of the first encryption method. The API based encryption selection algorithm may be an example of the second encryption selection method.

The result of the application of the method of FIG. 6 may be described with reference to an example source code of the data processing application which contains only SQL statements. FIG. 7 is an example source code of the data processing application which includes SQL statements. The method of FIG. 6 may recognize that the data attribute "name" is used independently and not used in any calculations. The method may also determine that it is critical information. Therefore, the method may suggest to use normal encryption for the data attribute "name". The method may further recognize that the data attribute "sales" is used independently but with calculations like multiplication and comparison. In this case, the method may suggest to use FHE-4 algorithm for data-attribute "sales". The method may further recognize that the data attribute "salary" is used together with data attribute "hours", and it is used in the comparison operation. The method may suggest to use FHE-2 algorithm for the whole data-attribute-set including attributes "salary" and "hours".

FIG. 8 is a flowchart of a method for determining encryptions configurations for the data attributes in accordance with an example of the present subject matter. For the purpose of explanation, the method described in FIG. 8 may be implemented in the system illustrated in FIG. 1 or 3, but is not limited to this implementation. The method of FIG. 8 provides an example implementation of step 603 of FIG. 6.

For a current data attribute (801) of the data attribute set it may be determined in step 802 from service metadata, whether the current data attribute is used only in Read, Write, or Delete operation.

If the current data attribute is not used only in read, write, or delete operation, it may be determined in step 803 whether the current data attribute 801 is dependent upon other data attributes. If the current data attribute 801 is not dependent upon other data attributes, policy-based FHE algorithm may be chosen in step 804 for current data attribute. If the current data attribute 801 is dependent upon other data attributes, a policy-based FHE algorithm may be chosen in step 805 for all data attributes in data-attribute-set. The other data attributes in the data-attribute-set are not scanned further for selecting homomorphic-encryption of these data attributes.

If the current data attribute is used only in read, write or delete operation, it may be determined in step 806 whether the current data attribute 801 is a critical attribute. If the current data attribute 801 is a critical attribute, a policy-based encryption algorithm may be chosen in step 807. If the current data attribute 801 is not a critical attribute a no encryption may be chosen for the current data attribute 801 and the next data attribute of the data attribute set may be processed. As shown in FIG. 8, after execution of steps 804 and 807 the next data attribute of the data attribute set may be processed. The policy-based encryption algorithm may be a normal encryption algorithm which may be selected as described in FIG. 11. The policy-based FHE algorithm may be a FHE algorithm which may be selected as described in FIG. 11.

The result of the application of the method of FIG. 9 may be described with reference to an example source code of the data processing application which contains API calls. FIG. 9 is an example source code of the data processing application which uses APIs provided by the remote system. The method may recognize external communications (service calls) and identify the data attributes that are going to be sent to the service. The method may analyze the other parts of the source code that will use the service calls. In addition, the method may also recognize the associated data attributes. This may result in determining that data attribute "uuid" is only used for indexing and it is not critical data (decided by policy). The method may suggest not to encrypt "uuid". Data attribute "timestamp" may be used in multiple APIs, and operations involving addition or subtraction etc. are performed on it. The method may suggest to use FHE-2 algorithm for the data attribute "timestamp". Data attribute "amount" is used in multiple APIs, and operations involving addition or subtraction etc. are performed on it. Metadata (e.g., as shown in FIG. 14) shows that data attributes "amount" and "address" are used together in some calculations. The method may suggest to use FHE-3 algorithm for the whole data-attribute-set comprising attributes "amount" and "address".

FIG. 10 shows an example API having data attributes, wherein each data attribute is associated with operations in which the data attribute is used and the encryption algorithm to be used for the data attribute. For example, the data attribute "uuid" is used in operations read, write and delete and thus the normal encryption algorithm is to be used for the data attribute "uuid".

Figure 11:
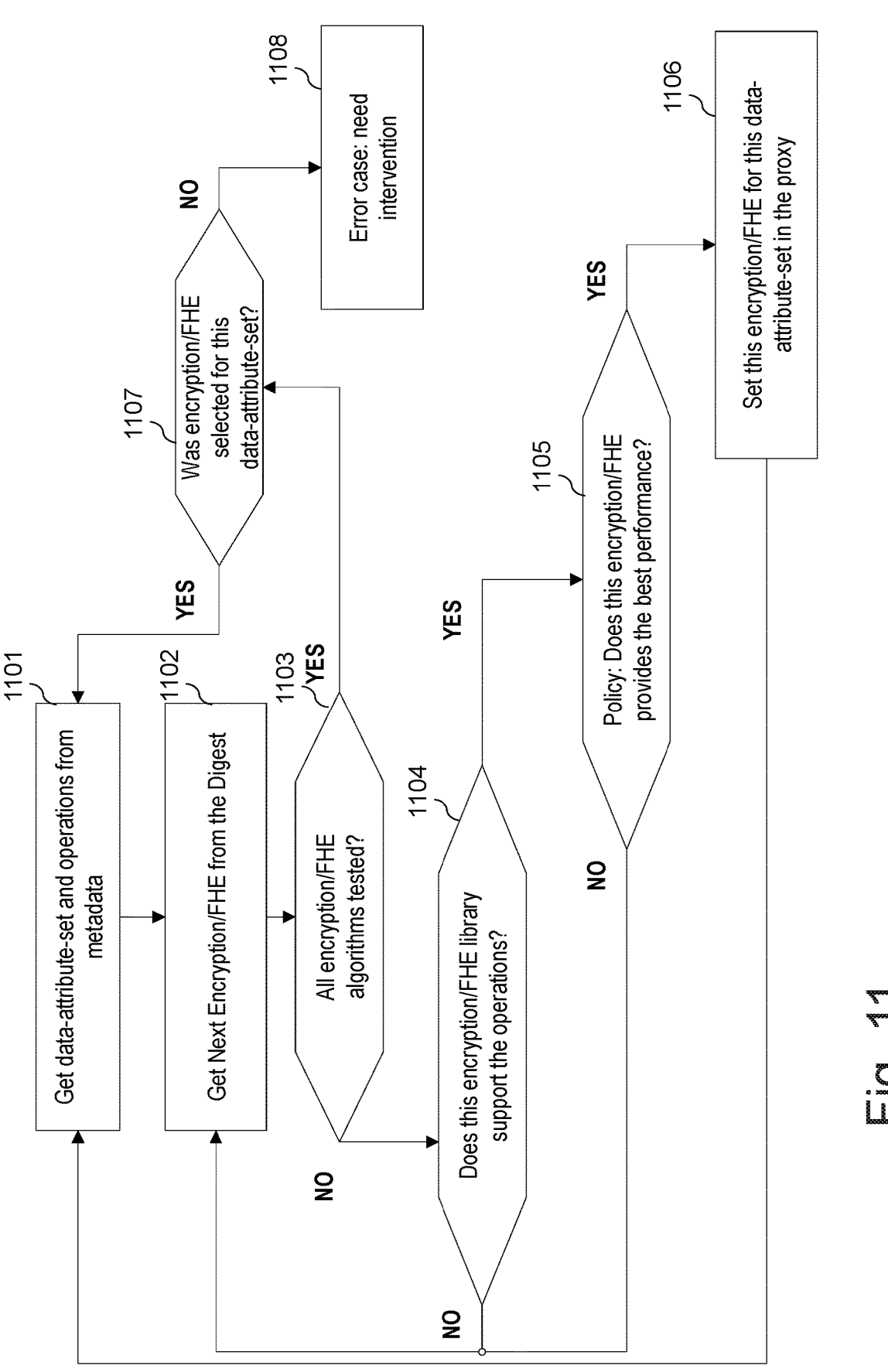
FIG. 11 is a flowchart of a method for selecting an encryption algorithm in accordance with an example of the present subject matter.

FIG. 11 is a flowchart of a method for selecting an encryption algorithm in accordance with an example of the present subject matter. For the purpose of explanation, the method described in FIG. 11 may be implemented in the system illustrated in FIG. 1 or 3, but is not limited to this implementation. The method of FIG. 11 may provide an example implementation of each step of steps 606, 608, 610, 804, 805 and 807.

The data attribute set and corresponding operations may be obtained in step 1101 from service metadata. The data attribute set may comprise one or more data attributes. In one example, for each iteration of the method of FIG. 11, the data attribute set may be one attribute of the identified attributes (e.g., which are identified in step 201 or FIG. 2). Alternatively, the data attribute set may be defined depending on the flow of the methods of FIGS. 6 and 8. For example, if for a given iteration of the method of FIG. 6, this method is called in step 606, then the data attribute set comprises multiple attributes as described in FIG. 6, if in another iteration of the method of FIG. 6 this method is called in step 608, the data attribute set may be one data attribute, and so forth.

A current Encryption/FHE algorithm may be selected 1102 from the digest. The list of algorithms and libraries to test may be provided as the digest by the client. For example, the client may specify the encryption algorithm to use for FHE by sending an encryption library.

It may be determined in step 1103 whether all encryption/FHE algorithms have been tested. If not all encryption/FHE algorithms have been tested, it may be determined in step 1104 whether the encryption/FHE library supports the operations. If the encryption/FHE library supports the operations it may be determined in step 1105 whether this encryption/FHE provides the best performance. If this encryption/FHE provides the best performance, this encryption/FHE may be set for this data-attribute-set in the proxy in step 1106.

If all encryption/FHE algorithms have been tested, it may be determined in step 1107 whether an encryption/FHE was selected for this data-attribute-set. If encryption/FHE was selected for this data-attribute-set a next data attribute set may be processed. If encryption/FHE was not selected for this data-attribute-set, an error case may be announced in step 1108. For example, in step 1108 a user predefined encryption may be used for the data attribute set. As shown in FIG. 11, after execution of steps 1104 and 1105 the next data attribute of the data attribute set may be processed.

Figure 12:
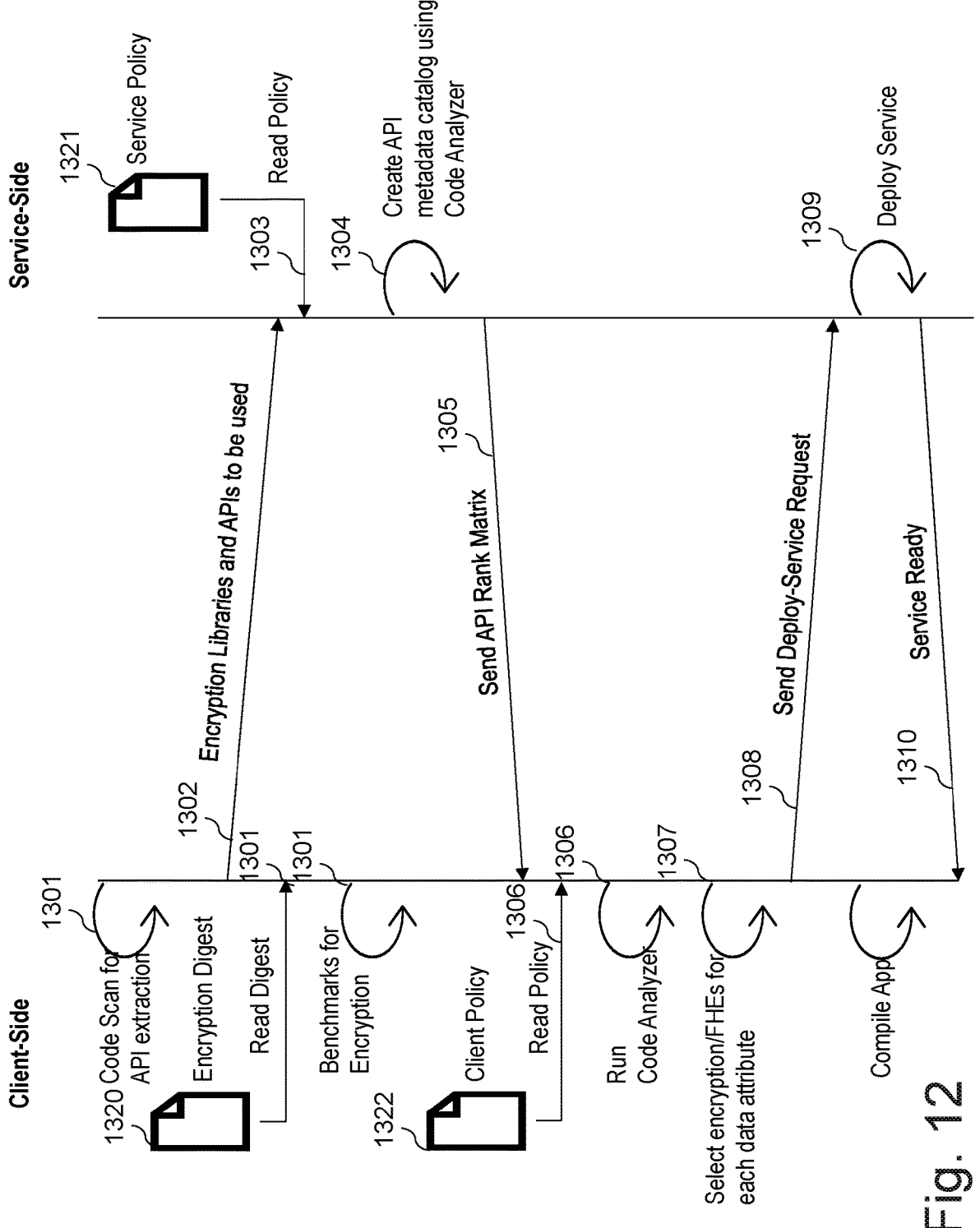
FIG. 12 is a signaling diagram of a method for remotely executing on a remote system a data processing application in accordance with an example of the present subject matter.

FIG. 12 is a signalling diagram illustrating of a method for remotely executing on a remote system a data processing application by a local system.

The local system may scan (1301) the code of the client for API extraction and read the digest 1320 of encryptions and determine benchmarks for encryption. The client may send (1302) the encryption libraries and the APIs to be used to the remote system. The remote system may read (1303) the service policy (1321) and create (1304) metadata using a code analyzer. The remote system may send (1305) an API rank matrix to the local system. The client system may read (1306) client policy 1322 and run a code analyzer in order to select (1307) encryption configurations for the data attributes. The local system may send (1308) a deploy service request to the remote system and compile the client application, the remote system may deploy (1309) the service and send (1310) a message to the local system indicating that the service is ready.

FIG. 13 depicts a table comprising example outcomes of the analysis of the data processing application by the local system. For example, the local system may analyze the code of the data processing application as well as the metadata of the services provided by the remote system in order to obtain the information listed in the table of FIG. 13. For that a code analyzer may be used. For example, the local system may identify data attributes 1401. And for each identified data attribute the local system may determine the external service 1402 that is invoked for the data attribute, the operation 1403 that involves the data attribute, how 1404 the data attribute is used, the calculation 1405 involved in the operation, the dependency 1406 of the data attribute, and the location 1407 (e.g., number of line code) in the code where the data attribute is identified.

FIG. 14 depicts a table comprising example of metadata which is provided by the remote system for describing the service provided by the remote system. The table comprises data attributes 1501 which are involved in or used by the service. And for each data attribute the metadata comprises the dependency 1502 of the data attribute, the API 1503 which is uses the data attribute, and the calculation 1504 that involves the data attribute.

Computing environment 1800 contains an example of an environment for the execution of at least some of the computer code involved in performing the inventive methods, such as a code 1900 for remotely executing a data processing application. In addition to block 1900, computing environment 1800 includes, for example, computer 1801, wide area network (WAN) 1802, end user device (EUD) 1803, remote server 1804, public cloud 1805, and private cloud 1806. In this embodiment, computer 1801 includes processor set 1810 (including processing circuitry 1820 and cache 1821), communication fabric 1811, volatile memory 1812, persistent storage 1813 (including operating system 1822 and block 1900, as identified above), peripheral device set 1814 (including user interface (UI) device set 1823, storage 1824, and Internet of Things (IoT) sensor set 1825), and network module 1815. Remote server 1804 includes remote database 1830. Public cloud 1805 includes gateway 1840, cloud orchestration module 1841, host physical machine set 1842, virtual machine set 1843, and container set 1844.

Figure 15:
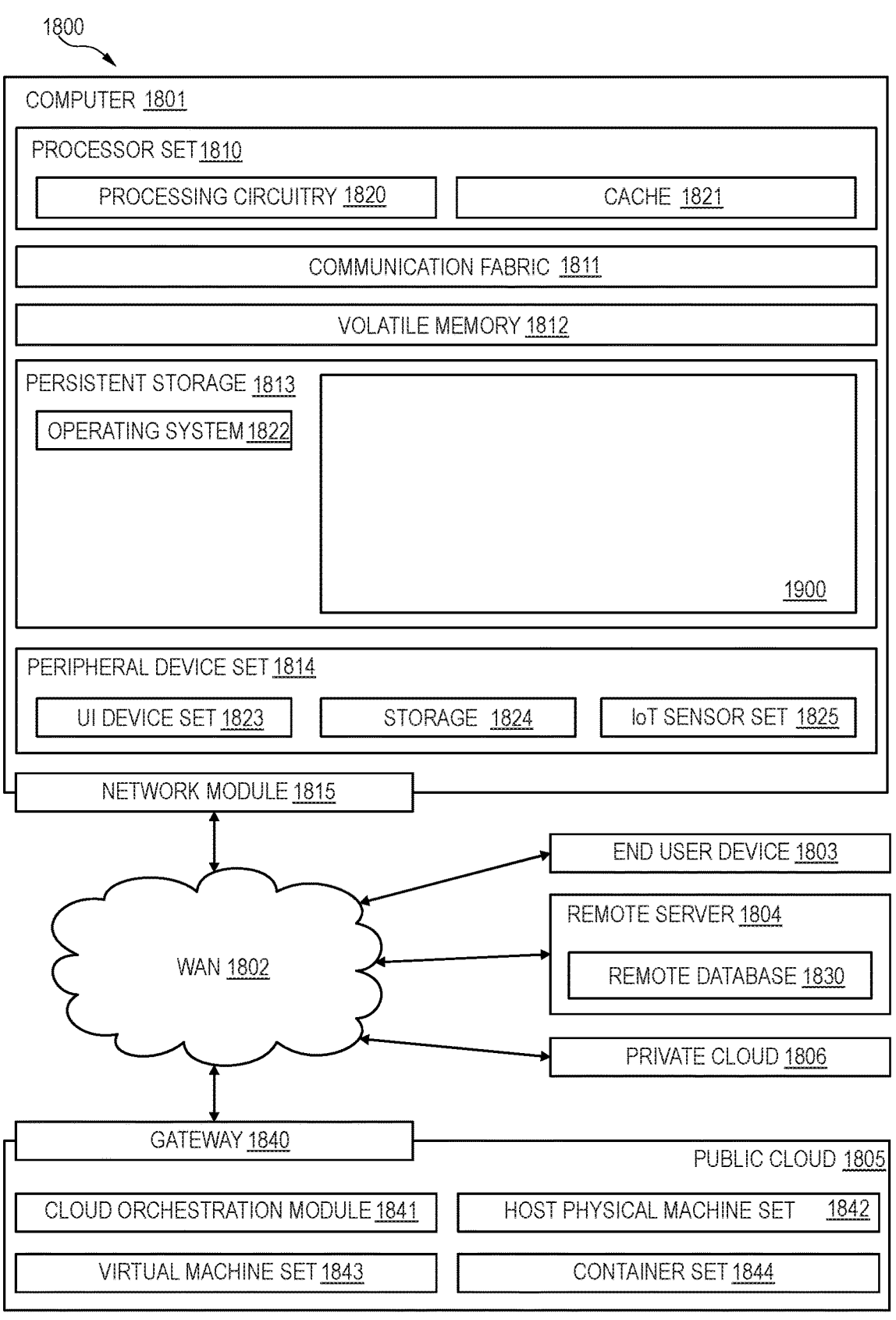
FIG. 15 is a computing environment in accordance with an example of the present subject matter.

COMPUTER 1801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1830. As is well understood in the art of computer technology, and depending upon the technology, performance of a computer-implemented method may be distributed among multiple computers and/or between multiple locations. On the other hand, in this presentation of computing environment 1800, detailed discussion is focused on a single computer, specifically computer 1801, to keep the presentation as simple as possible. Computer 1801 may be located in a cloud, even though it is not shown in a cloud in FIG. 15. On the other hand, computer 1801 is not required to be in a cloud except to any extent as may be affirmatively indicated.

PROCESSOR SET 1810 includes one, or more, computer processors of any type now known or to be developed in the future. Processing circuitry 1820 may be distributed over multiple packages, for example, multiple, coordinated integrated circuit chips. Processing circuitry 1820 may implement multiple processor threads and/or multiple processor cores. Cache 1821 is memory that is located in the processor chip package(s) and is typically used for data or code that should be available for rapid access by the threads or cores running on processor set 1810. Cache memories are typically organized into multiple levels depending upon relative proximity to the processing circuitry. Alternatively, some, or all, of the cache for the processor set may be located "off chip." In some computing environments, processor set 1810 may be designed for working with qubits and performing quantum computing.

Computer readable program instructions are typically loaded onto computer 1801 to cause a series of operational steps to be performed by processor set 1810 of computer 1801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1821 and the other storage media discussed below. The program instructions, and associated data, are accessed by processor set 1810 to control and direct performance of the inventive methods. In computing environment 1800, at least some of the instructions for performing the inventive methods may be stored in block 1900 in persistent storage 1813.

COMMUNICATION FABRIC 1811 is the signal conduction path that allows the various components of computer 1801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1812 is any type of volatile memory now known or to be developed in the future. Examples include dynamic type random access memory (RAM) or static type RAM. Typically, volatile memory 1812 is characterized by random access, but this is not required unless affirmatively indicated. In computer 1801, the volatile memory 1812 is located in a single package and is internal to computer 1801, but, alternatively or additionally, the volatile memory may be distributed over multiple packages and/or located externally with respect to computer 1801.

PERSISTENT STORAGE 1813 is any form of non-volatile storage for computers that is now known or to be developed in the future. The non-volatility of this storage means that the stored data is maintained regardless of whether power is being supplied to computer 1801 and/or directly to persistent storage 1813. Persistent storage 1813 may be a read only memory (ROM), but typically at least a portion of the persistent storage allows writing of data, deletion of data and re-writing of data. Some familiar forms of persistent storage include magnetic disks and solid state storage devices. Operating system 1822 may take several forms, such as various known proprietary operating systems or open source Portable Operating System Interface-type operating systems that employ a kernel. The code included in block 1900 typically includes at least some of the computer code involved in performing the inventive methods.

PERIPHERAL DEVICE SET 1814 includes the set of peripheral devices of computer 1801. Data communication connections between the peripheral devices and the other components of computer 1801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1823 may include components such as a display screen, speaker, microphone, wearable devices (such as goggles and smart watches), keyboard, mouse, printer, touchpad, game controllers, and haptic devices. Storage 1824 is external storage, such as an external hard drive, or insertable storage, such as an SD card. Storage 1824 may be persistent and/or volatile. In some embodiments, storage 1824 may take the form of a quantum computing storage device for storing data in the form of qubits. In embodiments where computer 1801 is required to have a large amount of storage (for example, where computer 1801 locally stores and manages a large database) then this storage may be provided by peripheral storage devices designed for storing very large amounts of data, such as a storage area network (SAN) that is shared by multiple, geographically distributed computers. IoT sensor set 1825 is made up of sensors that can be used in Internet of Things applications. For example, one sensor may be a thermometer and another sensor may be a motion detector.

NETWORK MODULE 1815 is the collection of computer software, hardware, and firmware that allows computer 1801 to communicate with other computers through WAN 1802. Network module 1815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1815 are performed on the same physical hardware device. In other embodiments (for example, embodiments that utilize software-defined networking (SDN)), the control functions and the forwarding functions of network module 1815 are performed on physically separate devices, such that the control functions manage several different network hardware devices. Computer readable program instructions for performing the inventive methods can typically be downloaded to computer 1801 from an external computer or external storage device through a network adapter card or network interface included in network module 1815.

WAN 1802 is any wide area network (for example, the internet) capable of communicating computer data over non-local distances by any technology for communicating computer data, now known or to be developed in the future. In some embodiments, the WAN 1802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1803 is any computer system that is used and controlled by an end user (for example, a customer of an enterprise that operates computer 1801), and may take any of the forms discussed above in connection with computer 1801. EUD 1803 typically receives helpful and useful data from the operations of computer 1801. For example, in a hypothetical case where computer 1801 is designed to provide a recommendation to an end user, this recommendation would typically be communicated from network module 1815 of computer 1801 through WAN 1802 to EUD 1803. In this way, EUD 1803 can display, or otherwise present, the recommendation to an end user. In some embodiments, EUD 1803 may be a client device, such as thin client, heavy client, mainframe computer, desktop computer and so on.

REMOTE SERVER 1804 is any computer system that serves at least some data and/or functionality to computer 1801. Remote server 1804 may be controlled and used by the same entity that operates computer 1801. Remote server 1804 represents the machine(s) that collect and store helpful and useful data for use by other computers, such as computer 1801. For example, in a hypothetical case where computer 1801 is designed and programmed to provide a recommendation based on historical data, then this historical data may be provided to computer 1801 from remote database 1830 of remote server 1804.

PUBLIC CLOUD 1805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1805 is performed by the computer hardware and/or software of cloud orchestration module 1841. The computing resources provided by public cloud 1805 are typically implemented by virtual computing environments that run on various computers making up the computers of host physical machine set 1842, which is the universe of physical computers in and/or available to public cloud 1805. The virtual computing environments (VCEs) typically take the form of virtual machines from virtual machine set 1843 and/or containers from container set 1844. It is understood that these VCEs may be stored as images and may be transferred among and between the various physical machine hosts, either as images or after instantiation of the VCE. Cloud orchestration module 1841 manages the transfer and storage of images, deploys new instantiations of VCEs and manages active instantiations of VCE deployments. Gateway 1840 is the collection of computer software, hardware, and firmware that allows public cloud 1805 to communicate through WAN 1802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1806 is similar to public cloud 1805, except that the computing resources are only available for use by a single enterprise. While private cloud 1806 is depicted as being in communication with WAN 1802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1805 and private cloud 1806 are both part of a larger hybrid cloud.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 16:
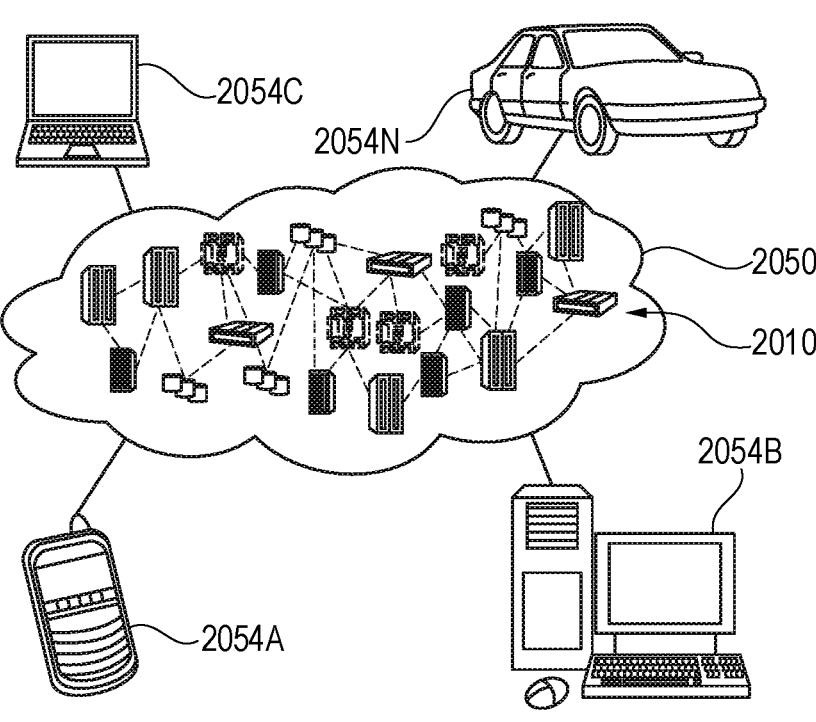
FIG. 16 depicts a cloud computing environment according to an embodiment of the present invention.

Referring now to FIG. 16, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 16 are intended to be illustrative only and that computing nodes 2010 and cloud computing environment 2050 can communicate with any type of computerized device over any type of network and/or network addressable connection (e.g., using a web browser).

Figure 17:
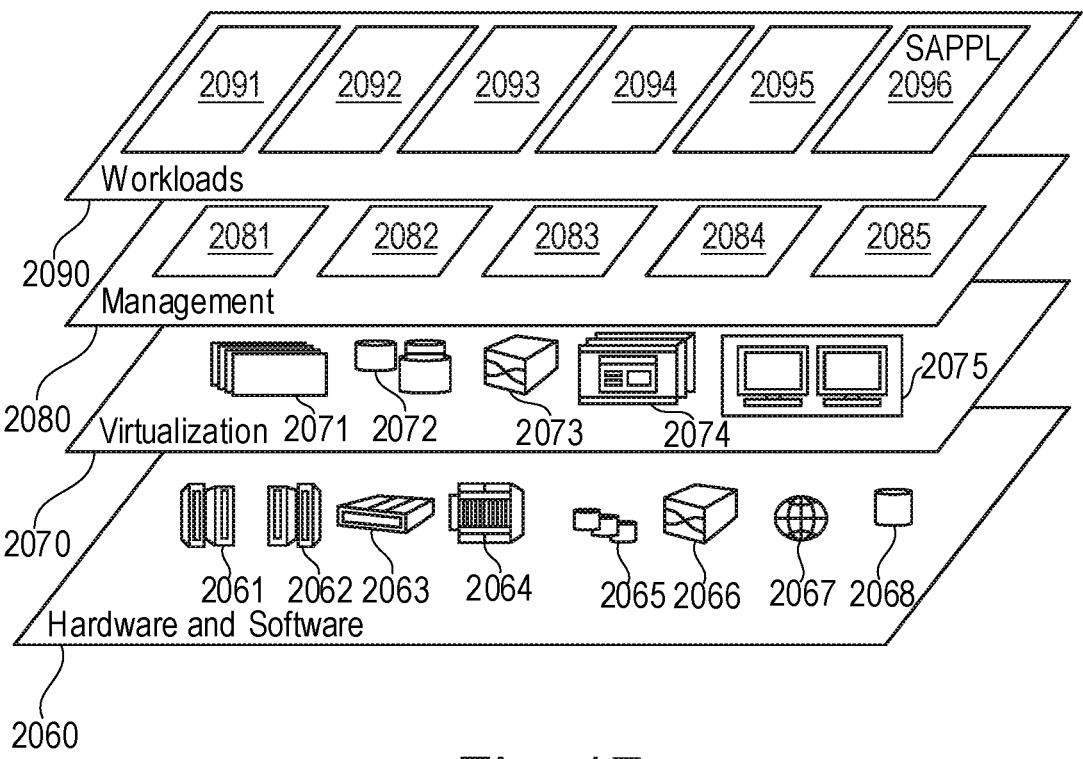
FIG. 17 depicts abstraction model layers according to an embodiment of the present invention.

Referring now to FIG. 17, a set of functional abstraction layers provided by cloud computing environment 2050 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized.

Examples of workloads and functions which may be provided from this layer include: mapping and navigation 2091; software development and lifecycle management 2092; virtual classroom education delivery 2093; data analytics processing 2094; transaction processing 2095; and an application e.g., a service application (SAPPL) 2096 that enables the execution of the data processing application in accordance with the present subject matter. For example, the SAPPL 2096 may enable execution of the method of FIG. 2, where the remote system may be part of the cloud computing environment and optionally the local system may also be part of the cloud computing environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

What is claimed is:

1. A method comprising:

identifying, using a data processing application, data attributes of data and operations on the data attributes;

using the operations of the data attributes for determining encryption configurations for the data attributes, the encryption configurations of the data attributes indicating whether the data attributes are to be encrypted and an encryption algorithm in case the data attributes are to be encrypted, resulting in a first data attribute of the data attributes to be encrypted, and a second data attribute of the data attributes not to be encrypted;

sending, by a local system and to a remote system, a list of encryption algorithms being available at the local system, the data attributes, and the operations;

receiving, in response to the sending and from the remote system, a service policy that is defined by the remote system, wherein the encryption algorithm is selected based on the service policy; and executing the data processing application on the remote system by executing a data provision method, the data provision method comprising:

encrypting values of the first data attribute according to the encryption algorithm; and sending encrypted values and unencrypted values of the data attributes to the remote system.

2. The method of claim 1, wherein the data provision method is executed by an encryption-decryption proxy, wherein executing the data processing application comprises sending requests by the local system to the remote system and execution of the requests at the remote system, wherein the data provision method comprises: the encryption-decryption proxy intercepting the requests, modifying intercepted requests which comprise the first data attribute to include the encrypted values, wherein the sending comprises sending the intercepted requests, after modification, to the remote system.

3. The method of claim 2, further comprising receiving at the encryption-decryption proxy from the remote system encrypted results of the data processing application; decrypting the encrypted results by the encryption-decryption proxy in accordance with the encryption algorithm, and receiving by the local system from the encryption-decryption proxy the unencrypted results.

4. The method of claim 2, wherein the encryption-decryption proxy is part of the local system or is remotely connected to the local system and the remote system.

5. The method of claim 1, wherein determining the encryption configurations for the data attributes comprises:

determining whether an operation on a data attribute includes one or more other data attributes of the data attributes, wherein the data attribute and the one or more other data attributes are referred to as data attribute set;

responsive to the operation on the data attribute not including one or more other data attributes of the data attributes, performing a first encryption selection method for determining the encryption configuration for the data attribute;

responsive to the operation on the data attribute including one or more other data attributes of the data attributes, determining whether any data attribute of the data attribute set is used in an Application Programming Interface (API) call for the data processing application;

responsive to the data attribute set including any data attribute which is used in an API call, performing a second encryption selection method for determining the encryption configuration for the data attribute set;

responsive to no data attribute of the data attribute set being used in an API call, determining that each data attribute of the data attribute set is to be encrypted with a selected homomorphic encryption algorithm.

6. The method of claim 5, wherein the first encryption selection method comprises:

determining whether the operation on the data attribute comprises a calculation involving the data attribute;

responsive to the operation on the data attribute comprising a calculation involving the data attribute, determining that the data attribute is to be encrypted with the selected homomorphic encryption algorithm;

responsive to the operation on the data attribute not comprising a calculation involving the data attribute, determining whether the data attribute is classified as a critical attribute according to a classification policy;

responsive to the data attribute being classified as the critical attribute, determining that the data attribute is to be encrypted with a selected normal encryption algorithm; and responsive to the data attribute not being classified as the critical attribute, determining that the data attribute is not to be encrypted.

7. The method of claim 5, wherein the performing of the second encryption selection method comprises for each data attribute of the data attribute set:

determining whether the operation on the data attribute is one operation of a list of operations, wherein the list of operations comprises a read operation, a write operation and a delete operation;

responsive to the operation on the data attribute being a member of the list of operations, determining whether the data attribute is classified as a critical attribute according to a classification policy;

responsive to the data attribute being classified as the critical attribute, determining that the data attribute is to be encrypted with a selected normal encryption algorithm;

responsive to the data attribute not being classified as the critical attribute, determining that the data attribute is not to be encrypted;

responsive to the operation on the data attribute not being in the list of operations, determining whether the data attribute is dependent on another data attribute;

responsive to the data attribute being dependent on another data attribute, determining that the data attribute set is to be encrypted with the selected homomorphic encryption algorithm and skipping any remaining non processed data attributes of the data attribute set; and responsive to the data attribute not being dependent on another data attribute, determining that the data attribute is to be encrypted with the selected homomorphic encryption algorithm.

8. The method of claim 1, wherein the encryption algorithm which is to be used for encryption of the first data attribute is a selected homomorphic encryption algorithm or a selected normal encryption algorithm.

9. The method of claim 8, the service policy being provided as a rank matrix which ranks the encryption algorithms for different combinations of data attributes and operations.

10. The method of claim 1, wherein the encryption algorithm is a selected homomorphic encryption algorithm or a selected normal encryption algorithm, the selection of the homomorphic encryption algorithm or of the normal encryption algorithm comprising:

a) selecting a respective encryption algorithm of a set of encryption algorithms;

b) determining whether the respective encryption algorithm supports the operation on the first data attribute;

c) responsive to the respective encryption algorithm supporting the operation on the first data attribute, evaluating a performance of the respective encryption algorithm for encryption of the first data attribute and going back step to a) for processing a next encryption algorithm;

d) responsive to the respective encryption algorithm not supporting the operation on the first data attribute, going back to step a) for processing a next encryption algorithm;

after selecting all the encryption algorithms, providing the encryption algorithm having a best performance value.

11. The method of claim 10, the performance indicating at least one selected from a group consisting of: a CPU usage, a memory usage, an accelerator usage, throughput, end-to-end latency, and a security level.

12. The method of claim 1, wherein identifying the data attributes and the operations is performed by at least: parsing a client program code that implements the data provision method, and in case the program code comprises API calls parsing metadata, wherein the metadata describes the APIs and is provided by a provider of the remote system or provided by the local system.

13. The method of claim 1, wherein the method is automatically performed in response to deploying the data processing application or in response to an update of the data processing application or the data provision method.

14. The method of claim 1, wherein the data processing application or the data provision method is provided as a cloud service, wherein the remote system or the local system are part of the cloud.

15. The method of claim 1, wherein the remote system is an untrusted system and the local system is a trusted system.

16. The method of claim 1, the encryption algorithm being a normal encryption algorithm or a homomorphic encryption algorithm wherein the normal encryption algorithm is a non-homomorphic encryption algorithm.

17. The method of claim 1, the data processing application is configured to store data, read data, or update data on the remote system.

18. A method comprising:

identifying, using a data processing application, data attributes of data and operations on the data attributes;

using the operations of the data attributes for determining encryption configurations for the data attributes, the encryption configurations of the data attributes indicating whether the data attributes are to be encrypted and an encryption algorithm in case the data attributes are to be encrypted, resulting in a first data attribute of the data attributes to be encrypted, and a second data attribute of the data attributes not to be encrypted;

wherein the encryption algorithm is selected based on a service policy provided by a remote system, wherein the service policy is provided as a rank matrix which ranks multiple encryption algorithms for different combinations of data attributes and operations; and executing the data processing application on the remote system by executing a data provision method, the data provision method comprising:

encrypting values of the first data attribute according to the encryption algorithm; and sending encrypted values and unencrypted values of the data attributes to the remote system.

19. A method comprising:

identifying, using a data processing application, data attributes of data and operations on the data attributes;

using the operations of the data attributes for determining encryption configurations for the data attributes, the encryption configurations of the data attributes indicating whether the data attributes are to be encrypted and an encryption algorithm in case the data attributes are to be encrypted, resulting in a first data attribute of the data attributes to be encrypted, and a second data attribute of the data attributes not to be encrypted, wherein the encryption algorithm is selected by:

selecting a respective encryption algorithm of a set of encryption algorithms;

determining whether the respective encryption algorithm supports the operation on the first data attribute;

responsive to the respective encryption algorithm supporting the operation on the first data attribute, evaluating a performance of the respective encryption algorithm for encryption of the first data attribute and processing a next encryption algorithm;

responsive to the respective encryption algorithm not supporting the operation on the first data attribute, processing a next encryption algorithm;

after selecting all of the set of encryption algorithms, selecting the encryption algorithm based on its performance value;

executing the data processing application on a remote system by executing a data provision method, the data provision method comprising:

encrypting values of the first data attribute according to the encryption algorithm; and sending encrypted values and unencrypted values of the data attributes to the remote system.

\* \* \* \* \*